(12) United States Patent
Ramesh et al.

(10) Patent No.: US 7,540,834 B2
(45) Date of Patent: Jun. 2, 2009

(54) BACKSEAMED CASING AND PACKAGED PRODUCT INCORPORATING SAME

(75) Inventors: Ram K. Ramesh, Greenville, SC (US); Michael J. Rosinski, Woodruff, SC (US)

(73) Assignee: Cryovac, Inc., Duncan, SC (US)

( * ) Notice: Subject to any disclaimer, the term of this patent is extended or adjusted under 35 U.S.C. 154(b) by 1120 days.

(21) Appl. No.: 09/764,673

(22) Filed: Jan. 18, 2001

(65) Prior Publication Data

US 2001/0041201 A1    Nov. 15, 2001

Related U.S. Application Data

(60) Division of application No. 08/968,016, filed on Nov. 12, 1997, now Pat. No. 6,221,410, which is a continuation of application No. 08/539,919, filed on Oct. 6, 1995, now abandoned, which is a continuation-in-part of application No. 07/951,245, filed on Sep. 25, 1992, now abandoned.

(51) Int. Cl.
*B31C 11/04* (2006.01)

(52) U.S. Cl. ............... 493/294; 493/269; 493/297; 429/127; 428/216; 428/504

(58) Field of Classification Search ........... 493/269, 493/294, 297, 254, 276; 426/127; 428/216, 428/504
See application file for complete search history.

(56) References Cited

U.S. PATENT DOCUMENTS

| | | | | |
|---|---|---|---|---|
| 3,130,647 A | * | 4/1964 | Anderson et al. | 493/193 |
| 3,670,954 A | | 6/1972 | Leventhal | 229/57 |
| 3,762,986 A | | 10/1973 | Bhuta et al. | 161/227 |
| 4,025,375 A | | 5/1977 | Leasure | 156/79 |
| 4,053,346 A | * | 10/1977 | Amberg et al. | 156/446 |
| 4,064,296 A | | 12/1977 | Bornstein et al. | 428/35 |
| 4,200,051 A | | 4/1980 | Nakahara et al. | 113/120 |
| 4,389,450 A | | 6/1983 | Schaefer et al. | 428/212 |
| 4,405,667 A | | 9/1983 | Christensen et al. | 428/35 |

(Continued)

FOREIGN PATENT DOCUMENTS

AU    A 47567/93    3/1994

(Continued)

*Primary Examiner*—Christopher Harmon
(74) *Attorney, Agent, or Firm*—Rupert B. Hurley, Jr.

(57) ABSTRACT

A heat-shrinkable backseamed casing film comprises a first layer, a second layer, and a third layer, with the first and third layers being outer layers and the second layer being between the first layer and the third layer. The first outer layer serves as an inside casing layer, and comprises polyolefin; the second layer comprises polyester and/or polyamide; the third layer serves as an outside casing layer and comprises polyolefin, polystyrene, and/or polyamide. The second layer has a thickness of at least about 5% of a total thickness of the heat-shrinkable casing film. Alternatively, the first layer comprises polyolefin and has a surface energy level of less than about 34 dynes/cm; the second layer comprises a polyamide having a melting point of at least 300° F.; and the third layer comprises polyolefin, polystyrene and/or polyamide. A package comprises a cooked meat product within the backseamed casing. The second layer of the casing film prevents or reduces necking down on the forming shoe during backseaming. The backseamed casing is especially useful for cook-in applications.

28 Claims, 6 Drawing Sheets

U.S. PATENT DOCUMENTS

| | | |
|---|---|---|
| 4,411,919 A | 10/1983 | Thompson |
| 4,448,792 A * | 5/1984 | Schirmer .................... 426/113 |
| 4,469,542 A * | 9/1984 | Reil ........................... 156/203 |
| 4,495,249 A | 1/1985 | Ohya et al. ................. 428/516 |
| 4,532,189 A | 7/1985 | Mueller ...................... 516/516 |
| 4,542,075 A | 9/1985 | Schirmer .................... 428/516 |
| 4,606,922 A | 8/1986 | Schirmer .................... 426/412 |
| 4,608,302 A | 8/1986 | Schirmer .................... 428/349 |
| 4,708,705 A * | 11/1987 | Aubry et al. ................ 493/211 |
| 4,734,327 A | 3/1988 | Vicik .......................... 428/332 |
| 4,734,956 A | 4/1988 | Frey et al. ...................... 17/33 |
| 4,741,938 A | 5/1988 | Kastl et al. .................... 428/36 |
| 4,758,463 A | 7/1988 | Vicik et al. ................. 428/216 |
| 4,762,748 A | 8/1988 | Oberle |
| 4,773,128 A | 9/1988 | Stanley et al. ................. 17/49 |
| 4,784,863 A | 11/1988 | Lustig et al. ................ 426/113 |
| 4,786,512 A | 11/1988 | Erk et al. .................... 426/105 |
| 4,834,822 A * | 5/1989 | Ueberegger ................ 156/203 |
| 4,855,183 A | 8/1989 | Oberle ........................ 428/345 |
| 4,857,399 A | 8/1989 | Vicik ........................... 428/332 |
| 4,872,302 A | 10/1989 | Van Eijsden et al. |
| 4,909,726 A | 3/1990 | Bekele ......................... 428/34 |
| 4,915,963 A | 4/1990 | Lustig et al. ................ 426/113 |
| 4,937,112 A | 6/1990 | Schirmer ................... 428/34.3 |
| 4,950,345 A * | 8/1990 | Kreager et al. ............. 156/203 |
| 4,963,418 A | 10/1990 | Isaka et al. ................. 428/34.9 |
| 4,963,419 A * | 10/1990 | Lustig et al. ............... 428/36.7 |
| 5,037,683 A | 8/1991 | Schirmer .................... 428/36.7 |
| 5,045,020 A | 9/1991 | Neeff et al. .................... 452/21 |
| 5,047,253 A | 9/1991 | Juhl et al. ................... 426/113 |
| 5,051,266 A | 9/1991 | Juhl et al. ................... 426/129 |
| 5,089,073 A | 2/1992 | Schirmer |
| 5,127,208 A * | 7/1992 | Custer et al. .................. 53/412 |
| 5,139,805 A * | 8/1992 | Tada et al. .................. 426/412 |
| 5,206,075 A | 4/1993 | Hodgson, Jr. |
| 5,218,071 A | 6/1993 | Tsutsui et al. |
| 5,272,236 A | 12/1993 | Lai et al. |
| 5,283,128 A | 2/1994 | Wilhoit |
| 5,328,705 A | 7/1994 | Wilhoit et al. |
| 5,356,676 A | 10/1994 | Von widdern et al. |
| 5,358,792 A | 10/1994 | Mehta et al. |
| 5,425,974 A | 6/1995 | Von Widdern et al. |
| 5,518,119 A | 5/1996 | Takahashi |
| 5,700,890 A | 12/1997 | Chou |
| 5,827,559 A | 10/1998 | Powell |
| 5,837,358 A | 11/1998 | Bauer et al. |
| 5,863,643 A | 1/1999 | Van Widdern et al. |
| 5,866,214 A | 2/1999 | Ramesh |
| 5,906,850 A | 5/1999 | Gasse et al. |
| 6,221,410 B1 | 4/2001 | Ramesh et al. |
| 2001/0036555 A1 | 11/2001 | Ramesh et al. |
| 2001/0041201 A1 | 11/2001 | Ramesh et al. |

FOREIGN PATENT DOCUMENTS

| | | |
|---|---|---|
| DE | 39 43 024 | 4/1991 |
| DE | 40 01 612 A1 | 7/1991 |
| EP | 0 149 321 | 11/1984 |
| EP | 0 334 291 | 9/1989 |
| EP | 0 435 498 A2 | 7/1991 |
| EP | 0 447 988 | 9/1991 |
| EP | 0 273 337 | 1/1992 |
| EP | 0 573 306 | 12/1993 |
| EP | 0 589 431 A1 | 3/1994 |
| EP | 0 603 678 | 6/1994 |
| GB | 2 139 948 | 5/1983 |
| GB | 2 126 191 | 3/1984 |
| GB | 2 221 649 | 3/1988 |
| JP | 3063133 A | 3/1991 |
| JP | 3121842 A | 5/1991 |

* cited by examiner

BACKSEAMED CASING AND PACKAGED PRODUCT INCORPORATING SAME

CROSS-REFERENCE TO RELATED APPLICATIONS

This is a divisional of U.S. Ser. No. 08/968,016 (now U.S. Pat. No. 6,221,410), filed Nov. 12, 1997, which is a continuation of U.S. Ser. No. 08/539,919 (now abandoned), filed Oct. 6, 1995, which is a continuation-in-part of U.S. Ser. No. 07/951,245 (now abandoned), filed in the U.S. Patent and Trademark Office Sep. 25, 1992, in the name of R. K. Ramesh.

FIELD OF THE INVENTION

The present invention relates generally to multilayer films, and particularly to multilayer films suitable for use in backseamed casings for packaging meat products. The present invention is particularly related to backseamed casings suitable for packaging protein-containing food products in which the film adheres to the food product, and especially to those having a relatively high protein content, also called 'low-fat' food products, such as poultry, ham, roast beef, etc. The present invention is also directed to packages.

BACKGROUND OF THE INVENTION

Processed meat products, such as poultry and ham, are often packaged in a flexible, thermoplastic, heat-shrinkable film tubing commonly referred to as a casing. Although some casings have a lay-flat width of 6-20 inches, some products, such as ham, etc., are quite often packaged in a casing of smaller lay-flat width, e.g., a width of from about 3 to 6 inches. Such casings often may need to have a precisely-controlled width, because the packages are stated as having a given weight, which is uniform among packages, and the packages also have product sliced at uniform intervals, with each package containing the same number of slices. Thus, variations in casing width can result in both an undesirable degree of variation in overall package weight, as well as an undesirable degree of variation in slice weights.

Thus, there is a need for a casing having a small and uniform diameter. However, it is relatively difficult to make a narrow width, heat-shrinkable seamless casing having a precisely controlled width, using a commercially feasible process. Consequently, there is a need for some other process for making a narrow-width, precisely-width-controlled casing.

Some backseamed casings are known to be casings of small and uniform diameter. Small-diameter backseamed casings are known which have a precisely controlled casing width, i.e., a lay-flat width independent of film extrusion variations. In the production of backseamed casings (e.g., using a backseaming machine such as a Nishibe HSP-250-SA backseaming machine obtained from Nishibe Kikai Co. Ltd. of Nagoya, Japan), a flat sheet of film is folded longitudinally by passage over a "forming shoe". A forming shoe is a part of the backseaming machine which the film is passed under and around, i.e., so that the initially flat film is reconfigured as a tube, having a longitudinal overlap and seal therealong (lap-sealed backseamed casing), or with film longitudinal edges abutted against one another (butt-sealed backseamed casing), with the width of the tube being determined by the circumference of the forming shoe. A longitudinal lap or butt seal is then applied while the film is between the forming shoe and a sealing device, resulting in a lap-sealed backseamed casing, or a butt-sealed backseamed casing. Butt-seal casings utilize a butt-seal tape sealed to the inside or the outside surface of the casing film, along both sides of the abutting longitudinal seam of the casing film. In either event, the resulting tubing, termed a "backseamed casing," is sealed or clipped at its ends after being filled with a meat product. For some uses, the meat product is thereafter cooked while in the backseamed casing.

It would be desirable to provide a highly uniform, small diameter backseamed casing suitable for cook-in end use, the casing being made from a film which adheres to high-protein meat products, such as certain grades of ham and turkey. Of course, it would also be desirable to provide the backseamed casing with a backseam seal which survives the cook-in process.

It is known that a polar surface is needed for adhesion of a film to a meat product. Adhesion of the film to the meat is frequently needed in order to prevent "purge", i.e., "cook-out", which can occur during the cooking of the meat packaged in the film if the film does adhere to the meat during cook-in. A polar film surface can be provided by using: (a) polar resin in the film layer in contact with the meat, and/or (b) surface modification, such as corona treatment, of the film surface in contact with the meat. Typically, polar polymers used for meat adhesion include: ethylene/unsaturated acid copolymer, anhydride-containing polyolefin, and polyamide.

Film-to-meat adhesion is known to be enhanced by corona treatment of the surface of the film to which the meat is to be adhered. However, corona treatment alters the film surface in a manner which can, on occasion, result in an inferior seal, i.e., a seal more likely to leak than if the film surface is not corona treated. This "leaky seal problem" can be avoided by "buffing off" the corona treatment in the area of the seal, so that the advantageous effects of the corona treatment, i.e., greater meat adhesion, can be retained on the majority of the meat-contact surface of the film, while at the same time avoiding, in the area of the seal, the seal-quality problem caused by the corona treatment. However, the buffing step is undesirable, as it is an additional processing step which renders the casing manufacture more complex and costly. Furthermore, the buffing step is frequently inconsistent.

Since the backseaming process is generally carried out after the corona treatment, shrinkage of the film against the forming shoe (during backseaming), coupled with forwarding the film over the forming shoe after shrinkage, results in the rubbing of the film against the forming shoe edges. This rubbing reduces or destroys corona treatment, at least in the area in which the film rubs against the forming shoe. As a result, backseamed casings containing corona treated films can exhibit purge at the locations at which the film rubs against the forming shoe. Furthermore, corona treatment can be inconsistent, at least with respect to prevention of purge for products having an intermediate protein content. It would be desirable that the casing film has a consistent and adequate level of protein/meat adhesion. As a result, it would be desirable to provide a corona-treatment-free backseamed casing which prevents purge from products relatively high in protein, where the adhesion of the casing film to the meat product is uniform over the film.

Thus, it would be desirable to provide a backseamed casing of small and uniform diameter which is heat-shrinkable and suitable for cook-in end use, exhibits good purge-resistance and good seal strength, can be economically manufactured, does not produce significant meat pull-off upon being stripped from a cooked meat product, and which provides a good oxygen barrier, in order to provide good shelf life to the cooked meat product.

Heat-shrinkable films having an outer layer capable of providing meat adhesion, which are otherwise suitable for use as backseamed casings, have been found to have the undesirable characteristic of necking down on the forming shoe during the backseaming process. The necking down on the forming shoe is believed to be due to shrinkage of the film during the heat sealing step of the backseaming operation. That is, the heat sealing step can cause substantial film shrinkage in an area extending outward from the seal, causing the edges of the casing to neck down on the forming shoe. The result of necking down is a casing having "ruffled edges", i.e., visible nonuniformities in the casing. In an extreme case, necking down results in the rupture of the film, as the shrinking of the film against the forming shoe places so much force on the film that the film ruptures. Thus, it would be desirable to provide a casing film which does not shrink down (i.e., "neck down") on the forming shoe during the backseaming operation.

SUMMARY OF THE INVENTION

It has been discovered that the presence of an inner layer comprising a polyamide, preferably a high modulus polyamide, provides, if the polyamide layer makes up at least 5 percent of the total film thickness, a film which does not neck down on the forming shoe during the backseaming operation. Although the reasons why the inner polyamide layer prevent necking down on the forming shoe are not currently known with certainty, it is believed that various factors, including heat transfer, shrink characteristics, etc. bring about the discovered advantage of not necking down on the forming shoe. Furthermore, the inner polyamide layer also helps to provide a better quality casing film by making the casing film easier to orient, facilitating faster backseaming speeds, and also imparting enhanced seal strength, toughness, pin-hole resistance and elastic recovery to the casing film.

It has also been discovered that in the case of anhydride-containing polyolefin, if the anhydride functionality is of the order of 1 weight percent or less, the polymer often does not provide adequate meat adhesion to intermediate-protein-containing meat products, or low-protein-containing meat products. On the other hand, polymers such as polyamide can, in some instances, provide too much meat-adhesion and tend to pull meat off during unpackaging of the meat, thereby destroying the smooth surface desired upon separating the casing film from the cooked meat product, and also contributing to yield loss. Polyamides are also relatively expensive polymers. Thus, it would be desirable to provide a casing having a film providing adequate meat adhesion to prevent purge, while being able to strip the film from the meat without meat pull-off due to too much adhesion of the film to the cooked meat product. However, it has been found that adequate meat adhesion can be obtained using an anhydride-containing polyolefin having an anhydride functionality of at least 1 percent.

As a first aspect, the present invention is directed to a backseamed casing comprising a heat-shrinkable casing film. The heat shrinkable film comprises a first layer, a second layer, and a third layer, with the first and third layers being outer layers and the second layer being between the first layer and the third layer. The first outer layer serves as an inside casing layer, and comprises a first polyolefin. The first polyolefin comprises at least one member selected from the group consisting of: (i) ethylene/unsaturated acid copolymer, propylene/unsaturated acid copolymer, and butene/unsaturated acid copolymer, wherein the unsaturated acid is present in an amount of at least 4 weight percent, based on the weight of the copolymer; and (ii) anhydride-containing polyolefin comprising an anhydride-functionality, wherein the anhydride functionality is present in an amount of at least 1 weight percent, based on the weight of the anhydride-containing polyolefin. The second layer comprises at least one member selected from the group consisting of polyester, and first polyamide. The third layer serves as an outside casing layer, and comprises at least one member selected from the group consisting of second polyolefin, polystyrene, and second polyamide. The second layer has a thickness of at least about 5% of a total thickness of the heat-shrinkable casing film.

In the first layer, the first polyolefin preferably comprises an ethylene/unsaturated acid copolymer having an unsaturated acid mer present in an amount of at least 6 percent, based on the weight of the ethylene/unsaturated acid copolymer; more preferably, the unsaturated acid is present in an amount of at least 9 weight percent, based on the weight of the ethylene/unsaturated acid copolymer.

The first layer preferably further comprises a third polyolefin comprising at least one member selected from the group consisting of polyethylene homopolymer, polyethylene copolymer, polypropylene homopolymer, polypropylene copolymer, polybutene homopolymer, and polybutene copolymer. More preferably, the third polyolefin comprises at least one member selected from the group consisting of ethylene/alpha-olefin copolymer, propylene/alpha-olefin copolymer, butene/alpha-olefin copolymer, ethylene/unsaturated acid copolymer, and ethylene/unsaturated ester copolymer. Still more preferably, the third polyolefin comprises at least one member selected from the group consisting of linear low density polyethylene (LLDPE), propylene/ethylene copolymer, and propylene/butene copolymer. Yet still more preferably, the third polyolefin comprises LLDPE.

The second layer preferably comprises the first polyamide. More preferably, the first polyamide comprises at least one member selected from the group consisting of polyamide 6, polyamide 66, polyamide 9, polyamide 10, polyamide 11, polyamide 12, polyamide 69, polyamide 610, polyamide 612, polyamide 6I, polyamide 6T, and copolymers thereof. Still more preferably, the first polyamide comprises at least one member selected from the group consisting of polyamide 6, polyamide 66 and copolyamide 6/66.

The third layer preferably comprises the second polyolefin. Preferably, the second polyolefin has a vicat softening point of at least 80° C.; more preferably, at least 90° C.; and still more preferably, at least 100° C. The softening point of the second polyolefin has to be high enough to undergo cook-in without causing the seals to fail (if the polyolefin is used in a seal layer). In an alternative preferred embodiment, the third layer comprises the second polyamide, with or without the second polyolefin, more preferably, as an alternative to the second polyolefin.

Preferably, the casing film further comprises a fourth layer, the fourth layer being an inner layer serving as an $O_2$-barrier layer, the fourth layer comprising at least one member selected from the group consisting of ethylene/vinyl alcohol copolymer, polyvinylidene chloride copolymer, polyethylene carbonate copolymer and polyamide. Preferably, the second layer and the fourth layer are directly adhered.

Preferably, the casing film further comprises a fifth layer and a sixth layer, wherein: (a) the fifth layer is between the first layer and the second layer, and the sixth layer is between the second layer and the third layer; (b) the fifth layer comprises at least one member selected from the group consisting of fourth polyolefin, polystyrene and polyurethane; and (c) the sixth layer comprises at least one member selected from the group consisting of fifth polyolefin, polystyrene and polyurethane. Preferably, the fifth layer is a tie layer and comprises at least one member selected from the group consisting of modified ethylene/alpha-olefin copolymer, modified ethylene/unsaturated ester copolymer, and modified ethylene/unsaturated acid copolymer. Preferably, the sixth layer is a tie layer and comprises at least one member selected from the group consisting of modified ethylene/alpha-olefin copolymer, modified ethylene/unsaturated ester copolymer, and modified ethylene/unsaturated acid copolymer.

Preferably, the casing film further comprises: (a) a seventh layer, the seventh layer being between the first layer and the second layer, the seventh layer comprising a sixth polyolefin; and (b) an eighth layer, the eighth layer being between the second layer and the third layer, the eighth layer comprising a seventh polyolefin.

Preferably, a ratio of: (a) a sum of the thickness of the first layer and the fifth layer; to (b) a sum of the thickness of the third layer and the sixth layer is from about 0.7:1 to 1.3:1. Preferably the second layer has a thickness of from about 5 to 20 percent, based on a total thickness of the multilayer film; and preferably, the fourth layer has a thickness of less than about 15%, based on a total thickness of the multilayer film. Preferably, the heat-shrinkable casing film has biaxial orientation. Preferably, the casing film has a free shrink, at 185° F., of at least 10% in at least one direction. Preferably, at least a portion of the casing film comprises a crosslinked polymer network.

The backseamed casing according to the present invention can be either a lap-sealed backseamed casing or a butt-sealed backseamed casing. A butt-sealed casing comprises both a casing film and a butt-seal tape film. Preferably, the butt-seal tape film comprises at least one member selected from the group consisting of polyolefin, polyamide or polystyrene, and preferably the butt-seal tape film is heat-shrinkable.

As a second aspect, the present invention is directed to a package comprising a cooked meat product within a backseamed casing. The backseamed casing is according to the first or third aspects of the present invention described herein, and the cooked meat product is adhered to a meat-contact surface of the casing film.

Preferably, the meat product comprises at least one member selected from the group consisting of poultry, ham, beef, lamb, fish, liver sausage, bologna, mortadella, braunschweiger, goat, and horse; more preferably, poultry, ham, beef, lamb, fish, liver sausage, bologna, and mortadella. Preferably, the meat-contact surface of the first layer is corona treated, and the meat product comprises at least one member selected from the group consisting of liver sausage, bologna and mortadella. Preferably, the outside surface of the casing film is also corona treated. Preferably, the meat comprises from 0-30% fat, more preferably from 1-15% fat, still more preferably from 2-10% fat, and yet still more preferably from 3-7% fat. Preferred backseamed casings for use in the package include the preferred backseamed casings in accordance with the present invention.

If a non-corona treated backseamed casing (or equivalent thereof) according to the first aspect of the present aspect is used, the cooked meat product preferably comprises at least one member selected from the group consisting of turkey, ham, beef, and fish, wherein the meat product comprises fat in an amount of from about 2 to 10 weight percent, preferably 3 to 8 percent, and more preferably from about 4 to 6 percent. If a corona treated backseamed casing (or equivalent thereof) according to the first aspect of the present aspect is used, the cooked meat product preferably comprises at least one member selected from the group consisting of ham, beef, liver sausage, bologna, mortadella, horse, and goat; more preferably, the meat product comprises at least one member selected from the group consisting of ham, liver sausage, bologna, and mortadella; preferably, the cooked meat product comprises fat in an amount of from about 3 to 40 weight percent, preferably 5 to 30 percent, and more preferably from about 10 to 15 percent.

If a non-corona treated backseamed casing (or equivalent thereof) according to the third aspect of the present aspect is used, the cooked meat product preferably comprises at least one member selected from the group consisting of turkey and fish, wherein the meat product comprises fat in an amount of from about 1 to 10 weight percent, preferably 2 to 6 percent, and more preferably from about 3 to 5 percent.

As a third aspect, the present invention is directed to a backseamed casing comprising a heat-shrinkable casing film comprising: (A) a first outer layer serving as an inside casing layer, the first outer layer comprising a first polyolefin, the first outer layer having a surface energy level of less than about 34 dynes/cm; (B) a second layer comprising a first polyamide having a melting point of at least 300° F.; (C) a third layer serving as an outside casing layer, the third outer layer comprising at least one member selected from the group consisting of a second polyolefin, polystyrene and second polyamide. The second layer is between the first layer and the third layer, and the second layer has a thickness of at least about 5% of a total thickness of the heat-shrinkable casing film.

In a lap-sealed backseamed casing according to this third aspect of the present invention, preferably the first polyolefin has a vicat softening point of at least 70° C., more preferably at least 80° C., in order to provide a desired level of seal strength. However, in a butt-sealed backseamed casing according to this third aspect of the present invention, the vicat softening point of the first polyolefin may be less critical. More preferably, the first polyolefin is a relatively non-polar polymer, preferably having a surface energy level of less than 32 dynes/cm.

DETAILED DESCRIPTION OF THE INVENTION

Figure 1:
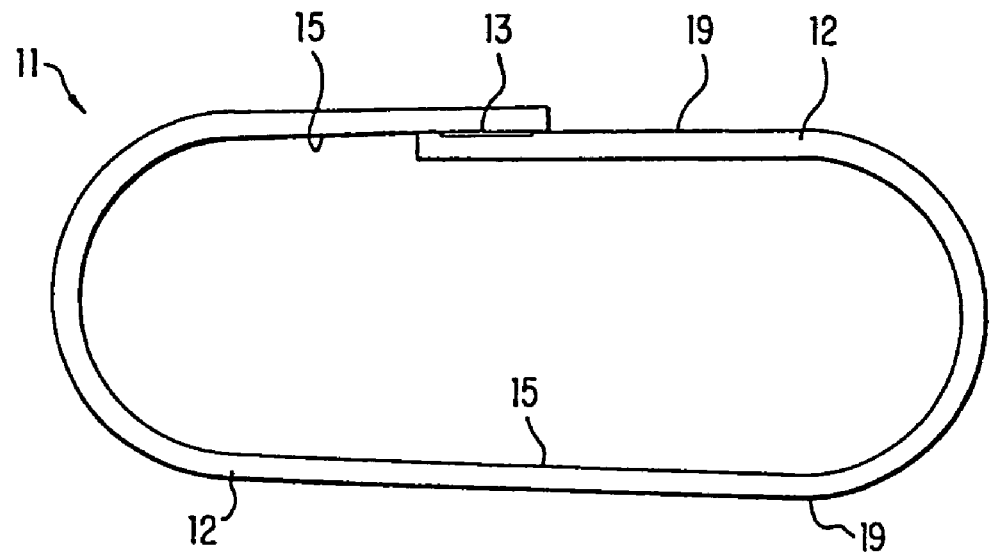
FIG. 1 illustrates a cross-sectional view of a lap-seal backseamed casing in accord with the present invention.

As used herein, the term "package" and the phrase "packaged product" refer to an article in which a product (preferably a food product, more preferably a meat-containing food product) is encased in a packaging film.

As used herein, the phrase "lay-flat film" refers to a film that has been extruded as a wide, thin-walled, circular tube, usually blown, cooled, then gathered by converging sets of rollers and wound up in flattened form. The phrase "lay-flat width", refers to half of the circumference of the inflated film tube.

As used herein, the phrase "backseamed casing" refers to any casing (a tubular film) having a longitudinal seal. For example, a lap-seal backseamed casing can be formed: by folding a film strip over a forming shoe of a horizontal sealing machine, and applying a longitudinal seal thereto where the film overlaps, e.g. using a Nishibe Model HSP-250-SA sealing machine; or a Totani Model FD-350C sealing machine obtained from Totani Giken Kogyo Co., Ltd., of Kyoto, Japan; or, by folding a film strip over a forming shoe of a vertical form fill and seal machine, and applying a longitudinal seal thereto where the film overlaps, e.g., using an ONPACK-2002™ sealing machine, obtained from Orihiro Company, Ltd., of Tomioka City, Japan. A lap-sealed casing could also use a tape-film in between the areas where the film overlaps, to facilitate sealing. A butt-seal backseamed casing can be formed: by folding a film strip over a forming shoe of a horizontal sealing machine, with opposing longitudinal edges abutting one another, i.e., in non-overlapping relation to one another; and thereafter, by applying a butt-seal tape film over the abutting edges, followed by sealing the butt-seal tape film across and along the abutting edges, so that a sealed tube is formed.

For the backseamed casings according to the present invention, the composition in the second layer can be present either in one or more layers of the casing film. If the composition is present in more than one layer, the layers are preferably so positioned as to provide reasonable symmetry to the film, thus providing a relatively flat, curl-free film.

Preferably, the backseamed casing according to the present invention has a lay-flat width of at less than about 10 inches; more preferably, from about 1 to 10 inches, still more preferably, from about 2 to 8 inches; yet still more preferably, from about 3 to 7 inches, and yet still even more preferably, from about 4 to 6 inches. It is believed that for any given film to be backseamed, the problem of necking down on the forming shoe becomes worse as the lay-flat width of the casing is reduced.

Heat-shrinkable multilayer films of the invention preferably have a substantially symmetrical cross-section, with respect to both layer thickness and layer chemical composition, in order to provide the film with relatively low curl. For example, for a 3-layer casing film according to the backseamed casing of the present invention, the ratio of a/b is preferably from about 0.7-1.3, more preferably from about 0.8-1.2, and even more preferably from about 0.9-1.1; wherein, 'a' is the thickness of the first outer layer and 'b' is the thickness of the second outer layer. For a preferred six-layer casing film in accordance with the backseamed casing of the present invention, the ratio of the sums of the thickness of the first layer plus the fifth layer to the sum of the second layer plus the sixth layer is preferably from about 0.7-1.3; more preferably from about 0.8 to 1.2; and still more preferably, from about 0.9 to 1.1.

The heat-shrinkable casing film according to the present invention preferably has a free shrink of from about 5-70 percent in one or both directions (i.e., longitudinal direction "L", also referred to as "machine direction", and transverse direction, "T") at 185° F., determined according to ASTM D 2732; more preferably, from about 10-50 percent at 185° F.; still more preferably, from about 15-35 percent at 185° F. Preferably, the casing film is biaxially oriented, and preferably the film has a free shrink, at 185° F., of at least 10 percent in each direction (L and T); more preferably, at least 15 percent in each direction. Preferably, the casing film has a total free shrink of from about 30 to 50 percent (L+T) at 185° F. For a butt seal backseamed casing, the butt seal tape film can be either a heat-shrinkable film or a non-heat-shrinkable film.

As used herein, the term "sealed" refers to any and all means of closing a package, such as heat sealing via hot air and/or heated bar, ultrasonic, radio frequency sealing, and even the use of clips on, for example, a shirred casing, etc. As used herein, the phrase "heat seal" refers to a seal formed by contacting the film with a hot element, e.g., using a hot bar, hot wire, hot air, etc.

Preferably, the seal in the backseamed casing according to the present invention has a seal strength of at least 3 pounds per inch (as measured on an Instron, per ASTM F88); more preferably, from about 5 to 100 lb/in; still more preferably, from about 7 to 50 lb/in; yet still more preferably, from about 10 to 30 lb/in; and yet still more preferably, from about 15 to 20 lb/in.

Figure 5:
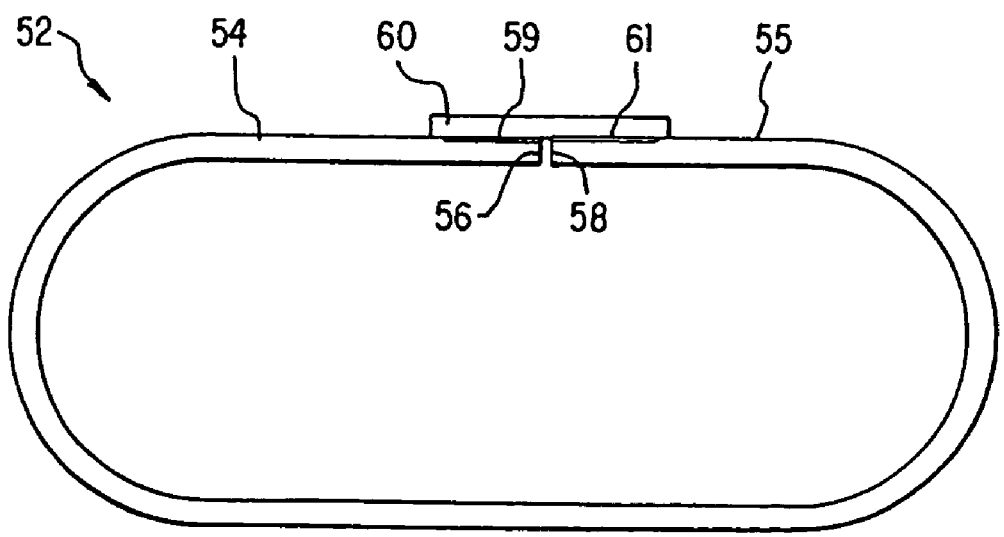
FIG. 5 illustrates a cross-sectional view of a butt-seal backseamed casing in accord with the present invention.

As used herein, the phrase "butt seal" refers to a seal formed by butting opposing film edges together and thereafter sealing regions in the vicinity of the abutted edges to a butt seal tape, as shown in FIG. 5.

Figure 4:
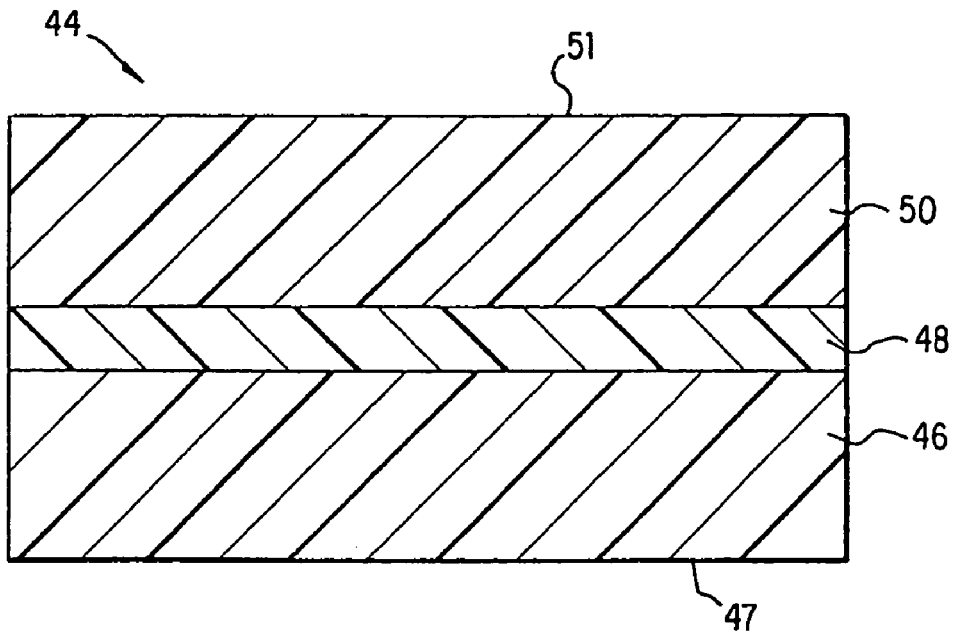
FIG. 4 illustrates an enlarged cross-sectional view of a third preferred casing film suitable for use in the lap-seal backseamed casing illustrated in FIG. 1.

As used herein, the phrase "lap seal" refers to a seal formed by lapping a film over itself to form a package by sealing an inside surface of the film to an outside surface of the film, as shown in FIG. 4.

As used herein, the phrase "meat-contact layer", refers to a layer of a multilayer film which is in direct contact with the meat-containing product packaged in the film. The meat-contact layer is an outer layer, in order to be in direct contact with the meat product. The meat-contact layer is an inside layer in the sense that in the packaged meat product, the meat-contact layer is the innermost film layer in direct contact with the food.

As used herein, the phrase "meat-contact surface" refers to a surface of a meat-contact layer which is in direct contact with the meat in the package.

As used herein, the phrase "meat-adhesion", and "adhered", refer to maintaining direct contact between the meat surface and the meat-contact surface of the film, so that there is an absence of fat or a substantial amount of free moisture, e.g., juices emitted outside of the meat product, commonly referred to as "purge". In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.1 percent based on the weight of the meat product before cooking.

As used herein, the phrase "cook-in" refers to the process of cooking a product packaged in a material capable of withstanding exposure to long and slow cooking conditions while containing the food product, for example cooking at 57° C. to 121° C. (i.e., 135° F.-250° F.) for 2-12 hours, preferably 57° C. to 95° C. (i.e, 135° F.-203° F.) for 2-12 hours. Cook-in packaged foods are essentially pre-packaged, pre-cooked foods which may be directly transferred to the consumer in this form. These types of foods may be consumed with or without warming. Cook-in packaging materials maintain seal integrity, and in the case of multilayer films are delamination resistant. Cook-in films may also be heat-shrinkable under cook-in conditions so as to form a tightly fitting package. Cook-in films preferably have a tendency for adhesion to the food product, thereby preventing "cook-out", i.e., "purge", which is the collection of juices between the outer surface of the food product and the meat-contact surface of the film, i.e., the surface in direct contact with the meat. Additional optional characteristics of films for use in cook-in applications include delamination-resistance, low $O_2$ permeability, heat-shrinkability representing about 20-50% biaxial shrinkage at about 85° C. (185° F.), and optical clarity.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "barrier", and the phrase "barrier layer", as applied to films and/or film layers, is used with reference to the ability of a film or film layer to serve as a barrier to $O_2$.

As used herein, the term "lamination", and the phrase "laminated film", refer to the process, and resulting product, made by bonding together two or more layers of film or other materials. Lamination can be accomplished by joining layers with adhesives, joining with heat and pressure, corona treatment, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerized in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. Such phrases as "ethylene alpha-olefin copolymer" is the respective equivalent of "ethylene/alpha-olefin copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p. 441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably, the homogeneous copolymer has a DSC peak $T_m$ of from about 90° C. to 110° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$-$C_{20}$ a-monoolefin, more preferably, a $C_4$-$C_{12}$ a-monoolefin, still more preferably, a $C_4$-$C_8$ a-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093,each of which is hereby incorporated by reference thereto, in its entirety. Further details regarding the production and use of one genus of homogeneous ethylene/alpha-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, polybutene, propylene/alpha-olefin copolymers, ethylene/alpha-olefin copolymers, butene/alpha-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc., are inclusive of not only polymers comprising repeating units derived from monomers known to polymerize to form a polymer of the named type, but are also inclusive of comonomers, derivatives, etc., which can copolymerize with monomers known to polymerize to produce the named polymer. Derivatives also include ionomers of the polymer(s). For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-modified polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT™ materials supplied by Exxon, and TAFMER™ materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY™ resins, are also included as another type of ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, e.g., modulus, and/or optics, and/or added abuse resistance, and/or specific impermeability.

As used herein, the phrases "seal layer" and "sealant layer", with respect to multilayer films, refers to an outer film layer, or layers, involved in the sealing of the film to itself or another layer. It should also be recognized that in general, the outer 0.5 to 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

According to the first aspect of the present invention as set forth above, if the first polyolefin comprises ethylene/unsaturated acid, propylene/unsaturated acid, and/or butene/unsaturated acid, preferably the unsaturated acid mer is present in an amount of from about 4 to 30 weight percent, based on the weight of the copolymer; more preferably, from about 7 to 20 percent; still more preferably, from about 8 to 15 percent; and, yet still more preferably, from about 9 to 13 percent. Depending upon the meat product, if the unsaturated acid mer is present in an amount less than 6 weight percent, sufficient purge-resistance may not be achieved upon cooking the meat product in the casing. On the other hand, if the amount of unsaturated acid mer is present in an amount greater than about 20 weight percent, the softening point of the unsaturated acid copolymer may be too low to facilitate film production and/or obtain satisfactory seal strength for cook-in end use. Thus, the optimal level of unsaturated acid mer depends on the manner in which the film is produced, and the particular end-use of the film, e.g., the type of meat being packaged, and the cook-in conditions.

If the first polyolefin comprises anhydride-containing polyolefin comprising an anhydride-functionality, preferably the anhydride functionality is present in an amount of from about 1 to 10 weight percent, based on the weight of the anhydride-containing polyolefin; more preferably, from about 2 to 5 weight percent.

In a lap-sealed backseamed casing according the present invention, preferably the first polyolefin has a vicat softening point of at least 70° C., more preferably at least 80° C., and still more preferably at least 90° C., in order to provide a desired level of seal strength. However, in a butt-sealed backseamed casing according to the present invention, in which a butt-tape film is sealed to the outer surface of the third film layer, the lower-limit of the softening point of the first polyolefin may be less critical.

Preferably, the first polyolefin is present in the first outer layer in an amount of from about 10 to 50 weight percent, based on the weight of the first layer; more preferably, in an amount of from about 10 to 30 percent; and still more preferably, in an amount of from about 15 to 25 percent.

As the third polyolefin, LLDPE is more preferred than propylene/ethylene copolymer because LLDPE produces a seal having less "pucker", if the second polyolefin also comprises LLDPE and the casing is a lap-seal backseamed casing. The third polyolefin provides the first layer with a high melting point resin, which is advantageous for cook-in end use, where the casing is subjected to relatively high temperatures for a relatively long period of time. Preferably, the third polyolefin has a melting point less than 160° C.; more preferably, less than 140° C., and still more preferably, less than 130° C. Preferably, the third polyolefin has a vicat softening point of at least 80° C., more preferably, at least 90° C., and still more preferably, at least 100° C.

In the second layer, the first polyamide preferably comprises at least one member selected from the group consisting of polyamide 6, polyamide 66, polyamide 9, polyamide 10, polyamide 11, polyamide 12, polyamide 69, polyamide 610, polyamide 612, polyamide 6I, polyamide 6T, and copolymers thereof; more preferably, at least one member selected from the group consisting of polyamide 6, polyamide 66 and polyamide 6/66. Preferably, the first polyamide has a melting point of at least 350° F.; more preferably, at least 370° F.; still more preferably, at least 390° F.

Preferably, the second layer further comprises a third polyamide having a melting point of less than about 350° F. Preferably, the second layer comprises: (a) polyamide 6 in an amount of from about 40 to 90 weight percent, based on the weight of the second layer; and (b) copolyamide 6/12 in an amount of from about 10 to 60 weight percent, based on the weight of the second layer, wherein the copolyamide 6/12 comprises caprolactam mer in an amount of from about 30 to 70 weight percent (more preferably, 40 to 60 weight percent).

Preferably, the first polyamide has a melting point above 350° F., and the third polyamide has a melting point below 350° F., as this combination has been found to produce a combination of modulus, orientation, seal strength, and pinhole-resistance which is preferred.

Preferably, the second polyolefin comprises at least one member selected from the group consisting of polyethylene homopolymer, polyethylene copolymer, polypropylene homopolymer, polypropylene copolymer, polybutene homopolymer, and polybutene copolymer. More preferably, the second polyolefin comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer. Still more preferably, the second polyolefin comprises at least one member selected from the group consisting of linear low density polyethylene (LLDPE), propylene/ethylene copolymer, and propylene/butene copolymer. Yet still more preferably, the second polyolefin comprises LLDPE. In a lap-seal backseam casing according to the present invention, preferably the second polyolefin and the third polyolefin are the same polymer.

If the fifth and sixth layers each comprise polystyrene or polyurethane, they may be the same polystyrene and/or polyurethane, or different polystyrenes and/or polyurethanes. In serving as tie layers, preferably the fifth and sixth layers each assist the adhesion of the preferably polyolefinic first and third layers to the polyamide layer, as well as to the $O_2$-barrier layer, if present.

The butt-seal tape film is chosen so that it is seal-compatible with the sealant surface of the casing film. Preferably, the butt-seal tape film comprises polyolefin as an outer sealing layer. More preferably, the butt-seal tape film further comprises an $O_2$-barrier layer. Still more preferably, the butt-seal tape film further comprises two tie layers, i.e., a tie layer between the $O_2$-barrier layer and each of the two outer layers, each of which comprise polyolefin. Preferably, the butt-seal tape film is heat-shrinkable, and preferably, the butt-seal tape film comprises an outer sealing layer comprising polyolefin having a melting point of from about 90° C.-150° C.; more preferably, from about 100° C.-130° C.

The seal layer of the butt-seal tape film is an outer film layer which preferably comprises at least one member selected from the group consisting of polyethylene homopolymer, polyethylene copolymer, polypropylene homopolymer, polypropylene copolymer, polybutene homopolymer, and polybutene copolymer; more preferably, ethylene/alpha-olefin copolymer, propylene/alpha-olefin copolymer, butene/alpha-olefin copolymer, ethylene/unsaturated ester copolymer, and ethylene/unsaturated acid copolymer; still more preferably, linear low density polyethylene (LLDPE), propylene/ethylene copolymer, and propylene/butene copolymer.

In the casing film according to the third aspect of the present invention, all of the various polymers present in each of the film layers are preferably as described above according to the first aspect of the present invention, except that the first polyolefin of the first layer has surface energy of less than 34 dynes/cm, more preferably, less than 32 dynes/cm. Thus, in the third aspect of the present invention, the first polyolefin preferably comprises at least one member selected from the group consisting of polyethylene homopolymer, polyethylene copolymer, polypropylene homopolymer, polypropylene copolymer, polybutene homopolymer, and polybutene copolymer. More preferably, the first polyolefin comprises at least one member selected from the group consisting of ethylene/alpha-olefin copolymer, propylene/alpha-olefin copolymer, butene/alpha-olefin copolymer, ethylene/unsaturated acid copolymer, and ethylene/unsaturated ester copolymer. Still more preferably, the first polyolefin comprises at least one member selected from the group consisting of linear low density polyethylene (LLDPE), propylene/ethylene copolymer, and propylene/butene copolymer. Yet still more preferably, the first polyolefin comprises LLDPE.

Preferably, the multilayer film has a shrink tension of at least about 10 psi, more preferably, from about 20-1000 psi, still more preferably, from about 100 to 600 psi; and yet still more preferably, from about 300 to 500 psi.

A preferred backseamed casing according to the present invention comprises a multilayer heat shrinkable film comprising a meat-adhesion layer comprising a polar polymer, which provides a high level of meat adhesion, especially to intermediate/high protein-containing meat products. Although this film can be corona treated, the film of the invention does not require corona treatment in order to exhibit a desired level of meat adhesion with products such as turkey, good-to-intermediate quality ham, and roast beef. However, the backseamed casing film of the present invention can be corona treated in order to provide an enhanced level of adhesion, especially with high fat products. Typically, films which by themselves have a relatively low level of meat-adhesion exhibit the 'buffing-off' problem described above, at least at the backseamed edges thereof. However, the films of the present invention have an advantage in that respect. Because the untreated films already have an acceptable level of meat-adhesion to intermediate-quality meat products, even when the corona treatment is buffed-off the surface during the backseaming operation, there is sufficient protein-adhesion from the polymer to prevent purge or fatting-out. Thus, the ultimate package still has an acceptable level of adhesion. Optionally, corona treatment could also be carried out after the backseamed tubing is made. Here, too, if a relatively low-meat-adhering-polymer is used as the inside casing layer and the resulting backseamed tubing is then corona treated, substantial purge (also known as cook-out and fatting-out) can occur on a strip at the edge of the backseamed tubing, where there is insufficient corona treatment (inherent in the process used to internally corona treat). However, the corona treatment of a film surface which already has an enhanced level of meat-adhesion (as is the case in the present invention) reduces or eliminates the purge or cook-loss at the casing lay flat edges (which, as described above, have not been substantially treated). Thus, the backseamed casing of the present invention avoids the "buffing off problem" associated with corona treatment, while at the same time achieving a satisfactory level of meat adhesion to various different kinds of protein-containing meat products.

As described above, the second layer of the casing film must have a thickness of at least about 5% of a total thickness of the heat-shrinkable casing film. That is, if the thickness of the second layer is less than about 5 percent of the total thickness of the film, the second layer may not perform adequately in preventing the film from shrinking down against the forming shoe.

If the heat-shrinkable casing film in the backseamed casing is made by orienting a tape which is heated over a very short time period, such as a tape heated by infrared radiation, the thickness of the second layer could be as high as 70%, based on the thickness of the multilayer film. However, if the film is heated over a relatively long time period, such as being heated in hot water, the preferred polyamides tend to crystallize to a relatively high level before the orientation step, which produces problems during the orientation step (the rate of crystallization depends on the type of polyamide used). In this latter situation, typically, the greater the thickness of the second layer, the more difficult it is to orient to obtain the resulting casing film. This forces a practical limit on the maximum percentage thickness of the second layer (especially when the most preferred polyamides are used), based on the total thickness of the multilayer casing film. Thus, if hot-water is used as the orientation medium, the second layer of the casing film preferably has a thickness of from about 5 to 50 percent of the total thickness of the casing film; more preferably, from about 5 to 40 percent; still more preferably, from about 10 to 30 percent; and yet still more preferably, from about 10 to 20 percent, based on a total thickness of the multi-layer film.

It has been discovered that the second layer, which preferably comprises polyamide, serves to prevent necking down on the forming shoe during the backseaming process. Necking down typically occurs during the backseaming process when the film is drawn so tightly around the forming shoe (as a result of the film shrinking due to the heat generated outwards from the seal area during the backseaming process) that it cannot be forwarded. The presence of the second layer, significantly reduces the necking down of the film by reducing that region of the film which shrinks due to the propagation of heat outward from the heat seal bar.

Preferably, the backseamed casing of the present invention comprises a casing film having from 3 to 20 layers; more preferably, from 4 to 12 layers; still more preferably, from 6 to 10 layers.

Preferably, the multilayer casing film used in the backseamed casing according to the present invention can have any total thickness desired, so long as the film provides the desired properties for the particular packaging operation in which the film is used. Preferably, the casing film used in the present invention has a total thickness, i.e., a combined thickness of all layers, of from about 0.5 to 10 mils (1 mil equals 0.001 inch); more preferably, from about 1 to 8 mils; and still more preferably, from 2 to 4 mils.

It should be noted that the modulus of the casing film should be high enough that so that the film does not stretch to an undesirable degree during the backseaming process. Preferably, the casing film has a modulus of at least 20,000 psi; more preferably, from about 30,000 to 250,000 psi; still more preferably, from about 40,000 to 150,000 psi.; yet still more preferably, from about 45,000 to 120,000; and even yet still more preferably, from about 50,000 to 70,000 psi. It should be kept in mind that if the modulus of the casing film is too high, problems could occur after backseaming, e.g., the film could flex-crack when being wound up after backseaming or cause difficulty in tracking. Furthermore, too high a modulus is especially undesirable if the film is to be used as a casing which is to undergo shirring, as films of too high a modulus may flex-crack during shirring. On the other hand, if the modulus of the film is too low, the film tends to stretch too much during backseaming, thereby producing backseamed casing of low quality in that it does not backseam acceptably, has a wavy appearance, and/or has ruffled edges, and/or seal pucker, and/or does not track well through the machine.

FIG. 1 illustrates lap-seal backseamed casing 11 according to the present invention. Lap-seal backseamed casing 11 comprises heat-shrinkable casing film 12, which is sealed to itself at backseam lap-seal 13.

Figure 2:
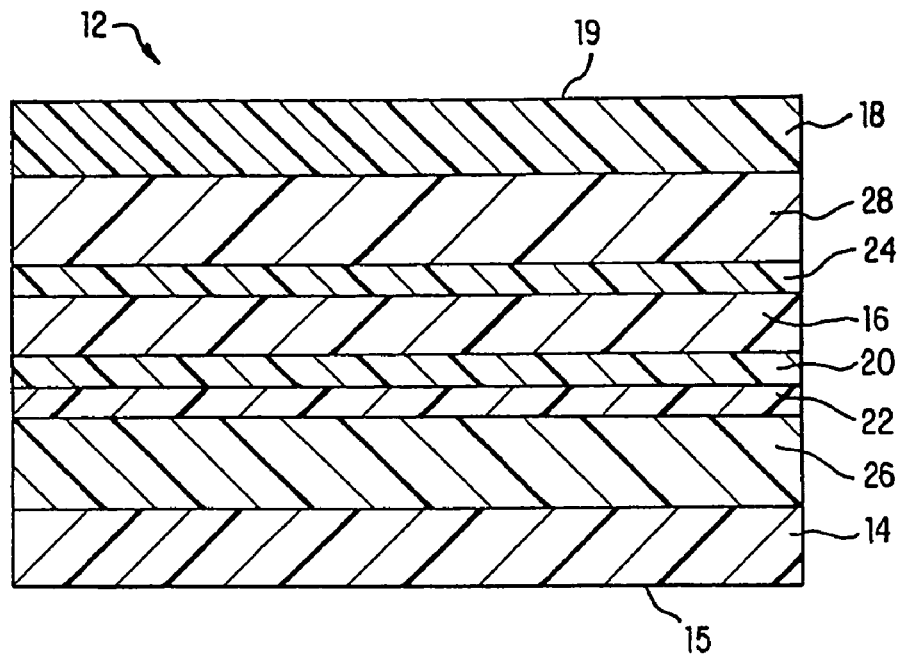
FIG. 2 illustrates an enlarged cross-sectional view of a first preferred casing film suitable for use in the lap-seal backseamed casing illustrated in FIG. 1.

FIG. 2 illustrates an enlarged cross-sectional view of heat-shrinkable casing film 12, which is especially suited to the packaging of meat. In FIG. 2, casing film 12 comprises: first layer 14, second layer 16, third layer 18, fourth layer 20, fifth layer 22, sixth layer 24, seventh layer 26, and eighth layer 28.

First layer 14 is an outer film layer which serves as an inside layer of the casing film. First layer 14 has outer meat-contact surface 15 for direct contact, and adhesion to, the meat being packaged in casing 11. Preferably, first layer 14 has a thickness of from about 0.1 to 3 mils; more preferably, from 0.2 to 1 mil; still more preferably, from 0.3 to 0.8 mil; and yet still more preferably, about 0.5 mils. First layer 14 comprises a polar polymer which preferably has a surface energy greater than 32 dynes/cm, more preferably greater than 34 dynes/cm, and still more preferably greater than 36 dynes/cm. Preferably, first layer 14 comprises a first polyolefin comprising at least one member selected from the group consisting of:

(i) ethylene/unsaturated acid copolymer, propylene/unsaturated acid copolymer, and butene/unsaturated acid copolymer, wherein the unsaturated acid (mer) is present in an amount of at least 4 weight percent, based on the weight of the copolymer; and (ii) anhydride-containing polyolefin comprising an anhydride-functionality, wherein the anhydride functionality is present in an amount of at least 1 weight percent, based on the weight of the anhydride-containing polyolefin;

More preferably, first layer 14 comprises a first polyolefin comprising at least one member selected from the group consisting of:

(i) ethylene/unsaturated acid copolymer, propylene/unsaturated acid copolymer, and butene/unsaturated acid copolymer, wherein the unsaturated acid (mer) is present in an amount of from about 6-30%, more preferably from about 7-20%, still more preferably from about 8-15%, and yet still more preferably, from about 9-13%, based on the weight of the copolymer; and (ii) anhydride-containing polyolefin comprising an anhydride-functionality, wherein the anhydride functionality is present in an amount of from about 1 to 10 weight percent, based on the weight of the anhydride-containing polyolefin; more preferably from about 2 to 5 weight percent.

If the first polyolefin comprises unsaturated acid copolymer, if the unsaturated acid mer is present in an amount less than 6 weight percent, sufficient purge resistance may not be achieved. On the other hand, if the amount of unsaturated acid (mer) in the copolymer is greater than about 20 weight percent, the softening point of the unsaturated acid copolymer may be too low to facilitate processing into film and/or obtain satisfactory seal strength during cooking. The preferred unsaturated acid (mer) level may vary depending on the end application, i.e., the type of meat product to be adhered to.

In any backseamed casing according to the present invention, preferably, the inside film layer (which serves as a food-contact layer, and, in the lap seal backseamed casing according to the present invention also serves as a sealant layer) does not comprise a blend of propylene/ethylene copolymer and homogeneous ethylene/alpha-olefin copolymer having a density of less than 0.90. That is, if this blend makes up the majority of the seal layer, the seal strength may be less than preferred. Furthermore, if this blend makes up the majority of the seal layer, no core layer of polyester and/or first polyamide is required in order to backseam the film without a detrimental degree of necking down on the forming shoe.

Multilayer film 12 may be used in either a lap-seal backseamed casing or a butt-seal backseamed casing. In a lap-seal backseamed casing such as casing 11, preferably the first polyolefin has a vicat softening point of at least 70° C., more preferably at least 80° C., in order to retain good seal strength during cook-in. However, for a butt-sealed backseamed casing, the lower-limit of the softening point of the first polyolefin may be less critical, as it is both the softening point of the third layer of the casing film, as well as the softening point of the sealant layer of the butt-seal tape film, which govern sealability and seal strength during cooking.

Preferably, first layer 14 further comprises a third polyolefin comprising at least one member selected from the group consisting of polyethylene homopolymer, polyethylene copolymer, polypropylene homopolymer, polypropylene copolymer, polybutene homopolymer, and polybutene copolymer. More preferably, the third polyolefin comprises at least one member selected from the group consisting of ethylene/alpha-olefin copolymer, propylene/alpha-olefin copolymer, butene/alpha-olefin copolymer, ethylene/unsaturated acid copolymer, and ethylene/unsaturated ester copolymer. Even more preferably, the third polyolefin comprises at least one member selected from the group consisting of linear low density polyethylene (LLDPE), propylene/ethylene copolymer, and propylene/butene copolymer. Preferably, the third polyolefin has a vicat softening point of at least 80° C., more preferably, at least 90° C., and even more preferably at least 100° C. Preferably, the first polyolefin is present in an amount of from about 10-50%, more preferably, in an amount of from about 10-30%, and even more preferably, in an amount of from about 15-25%, based on the composition of the first outer layer.

The third polyolefin provides first layer 14 with a higher softening point polymer to enhance the stability of the film, and seals thereof, during cook-in/.

Furthermore, the dilution of the polar polymer with a relatively non-polar polymer, i.e., the third polyolefin, does not significantly decrease the purge-resistance characteristics of the first layer of the casing film. Preferably, first layer 14 comprises a blend of 80 weight percent LLDPE and 20 weight percent ethylene/unsaturated acid copolymer.

Second layer 16 is an inner film layer which is between first layer 14 and third layer 18. Second layer 16 provides casing film 11 with the characteristic of undergoing the backseaming operation without necking down on the forming shoe. Second layer 16 also helps to provide a better quality casing film by making casing film 12 easier to orient, and facilitating faster backseaming speeds, and also imparting enhanced seal strength, toughness, pin-hole resistance and elastic recovery to casing film 12. Second layer 16 preferably comprises at least one member selected from the group consisting of polyester, and first polyamide, i.e., polymers having relatively high modulus and/or relatively high elastic recovery. More preferably, second layer 16 comprises the first polyamide; still more preferably, at least one member selected from the group consisting of polyamide 6, polyamide 66, polyamide 9, polyamide 10, polyamide 11, polyamide 12, polyamide 69, polyamide 610, polyamide 612, polyamide 6I, polyamide 6T, as well as copolymers prepared from copolymerization of any one or more of the monomers used in the preparation of any of these polyamides; and yet still more preferably, at least one member selected from the group consisting of polyamide 6, polyamide 66 and polyamide 6/66. Preferably, the first polyamide has a melting point of at least 350° F.; more preferably, at least 370° F.; even more preferably, at least 390° F. Preferably, second layer 16 has a thickness of from about 0.05 to 1 mil; preferably, from 0.1 to 0.5 mil; more preferably, from about 0.2 to 0.4 mil, and still more preferably, about 0.3 mils.

Preferably, second layer 16 further comprises a third polyamide having a melting point of less than about 350° F. Preferably, second layer 16 comprises: (a) polyamide 6 in an amount of from about 40 to 90 weight percent, based on the weight of the first inner layer; and (b) copolyamide 6/12 in an amount of from about 10 to 60 weight percent, based on the weight of the first inner layer, wherein the copolyamide 6/12 comprises caprolactam (mer) in an amount of from about 30 to 70 weight percent, based on the weight of the copolyamide; more preferably, from about 40 to 60 weight percent.

Third layer 18 is an outer film layer which serves as an outside abuse-resistant and heat-seal layer of casing 11. Preferably, third layer 18 has a thickness of from about 0.1 to 3 mils; more preferably, from about 0.2 to 1 mil; still more preferably, from about 0.3 to 0.8 mil; and, yet still more preferably, about 0.35 to 0.65 mil.

Preferably, third layer 18 comprises at least one member selected from the group consisting of second polyolefin, polystyrene, second polyamide, polyester, polymerized ethylene/vinyl alcohol copolymer, polyvinylidene chloride, polyether, polyurethane, polycarbonate, and starch-containing polymer; more preferably, third layer 18 comprises the second polyolefin; still more preferably, at least one member selected from the group consisting of polyethylene homopolymer, polyethylene copolymer, polypropylene homopolymer, polypropylene copolymer, polybutene homopolymer, and polybutene copolymer; yet still more preferably, third layer 18 comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and yet still even more preferably, third layer 18 comprises at least one member selected from the group consisting of linear low density polyethylene (LLDPE), propylene/ethylene copolymer, and propylene/butene copolymer.

In a lap-seal backseam casing, the second polyolefin and the third polyolefin are preferably the same polymer.

Preferably, the second polyolefin has a vicat softening point of at least 80° C., more preferably, at least 90° C., and even more preferably at least 100° C. The softening point of the second polyolefin needs to be high enough for the casing to survive cook-in.

Fourth layer 20 is an internal layer which is between first layer 14 and third layer 18, and preferably comprises a polymer having relatively high oxygen barrier characteristics. Preferably, fourth layer 20 has a thickness of from about 0.05 to 2 mils; more preferably, from 0.05 to 0.5 mil; still more preferably, from 0.1 to 0.3 mil; and yet still more preferably, from about 0.12 to 0.17 mils. In general, fourth layer 20 comprises at least one member selected from the group consisting of polymerized ethylene vinyl alcohol (EVOH), polyvinylidene chloride, fourth polyamide, polyalkylene carbonate, and polyester; preferably, at least one member selected from the group consisting of polymerized ethylene vinyl alcohol and fourth polyamide; more preferably, polymerized ethylene vinyl alcohol; still more preferably, polymerized ethylene vinyl alcohol having about 44 mole percent ethylene.

Fifth layer 22 and sixth layer 24 are tie layers in casing film 12. Fifth layer 22 is between first layer 14 and second layer 16; sixth layer 24 is between second layer 16 and third layer 18. As a general rule, tie layers should have a relatively high degree of compatibility with barrier layers, such as polymerized EVOH, or the polyamide layer, as well as non-barrier layers, such as polymerized ethylene alpha-olefin copolymer. The composition, number, and thickness of tie layers is as known to those of skill in the art. Preferably, fifth layer 22 and sixth layer 24 each have a thickness of from about 0.05 to 2 mils; more preferably, from about 0.05 to 0.5 mil; still more preferably, from about 0.1 to 0.3 mil; and yet still more preferably, from about 0.12 to 0.17 mils. Preferably, fifth layer 22 comprises at least one member selected from the group consisting of fourth polyolefin, polystyrene and polyurethane; more preferably, at least one member selected from the group consisting of modified ethylene/alpha-olefin copolymer, modified ethylene/unsaturated ester copolymer, and modified ethylene/unsaturated acid copolymer. Preferably, sixth layer 24 comprises at least one member selected from the group consisting of fifth polyolefin, polystyrene and polyurethane; more preferably, at least one member selected from the group consisting of modified ethylene/alpha-olefin copolymer, modified ethylene/ unsaturated ester copolymer, and modified ethylene/unsaturated acid copolymer.

Seventh layer 26 is a core layer between first layer 14 and second layer 16. Seventh layer 26 provides the multilayer casing film 12 film with desired abuse, shrink, and optical characteristics, and preferably comprises a polymer having relatively low cost while providing these characteristics. Preferably, seventh layer 26 has a thickness of from about 0.1 to 3 mils; more preferably, from 0.2 to 1.5 mils; still more preferably, from 0.3 to 1 mil; and yet still more preferably, from about 0.50 to 0.80 mils. Preferably, seventh layer 26 comprises at least one member selected from the group consisting of polyolefin, polyamide, polyester, and polyurethane; more preferably, polyolefin; still more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and yet still more preferably, a blend of 80 weight percent ethylene vinyl acetate copolymer (having 6 weight percent vinyl acetate mer) with 20 weight percent high density polyethylene.

Eighth layer 28 is a core layer between second layer 16 and third layer 18. Eighth layer 18 also provides the multilayer film with desired abuse, shrink, and optical characteristics, and preferably comprises a polymer having relatively low cost while providing these attributes. In general, eighth layer 18 can have a thickness of from about 0.1 to 3 mils; preferably, from 0.2 to 1.5 mil; more preferably, from 0.3 to 1 mil; and still more preferably, from about 0.50 to 0.80 mils. In general, eighth layer 18 comprises at least one member selected from the group consisting of polyolefin, polyamide, polyester, and polyurethane; preferably, polyolefin; more preferably at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; still more preferably, a blend of 80 weight percent ethylene vinyl acetate copolymer (having 6 weight percent vinyl acetate) with 20 weight percent ethylene/unsaturated acid copolymer.

Seventh layer 26 and eighth layer 28 are typically chosen in composition and layer thickness so as to provide a relatively flat, curl-free, heat-shrinkable casing film. Preferably, seventh layer 26 and eighth layer 28 have a composition and thickness so as to provide the multilayer film with as much cross-sectional symmetry as possible. Cross-sectional symmetry provides the film with the desired characteristics of low curl and low floppiness.

If "a" represents a sum of the thicknesses of the first, fifth, and seventh layers, and "b" represents a sum of the thicknesses of the second, sixth, and eighth layers, then preferably, a:b is from about 0.5:1 to 1.5:1, more preferably 0.7:1 to 1.3:1, still more preferably, from about 0.8:1 to 1.2:1.

In casing 11, backseam seal 13 can be formed using any one or more of a wide variety of sealing devices, as known to those of skill in the art, such as heat sealing via hot air and/or heated bar and/or hot wire, ultrasonic sealing, radio frequency sealing, etc. However, a preferred sealing mechanism is the use of a heated seal bar which provides for better sealability and can provide better ultimate seal strength, thus providing seals capable of surviving the cooking process.

Figure 3:
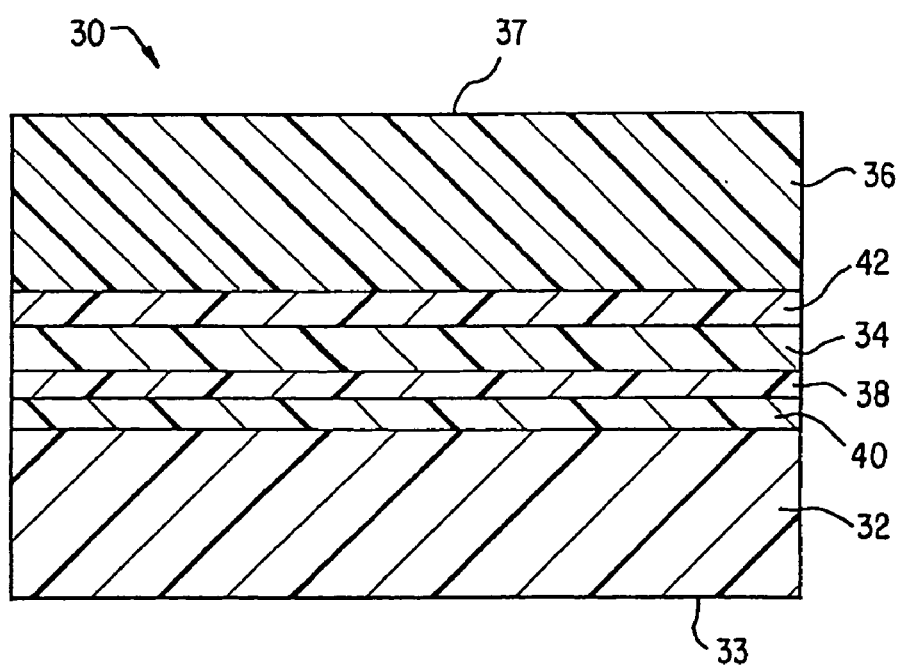
FIG. 3 illustrates an enlarged cross-sectional view of a second preferred casing film suitable for use in the lap-seal backseamed casing illustrated in FIG. 1.

FIG. 3 illustrates alternative preferred six-layer, heat-shrinkable casing film 30 suitable for use as a lap-seal casing as illustrated in FIG. 1, as well as a butt-seal casing as illustrated in FIG. 5. As with multilayer film 12 of FIG. 2, multilayer film 30 is also especially suited to the packaging of meat products which are thereafter subjected to cook-in. Casing film 30 comprises first layer 32, second layer 34, third layer 36, fourth layer 38, fifth layer 40, and sixth layer 42.

First layer 32 is an outer film layer which serves as an inside casing film layer, and accordingly is a meat-contact layer which is analogous to first layer 14 of FIG. 2. When in the form of casing, first layer 32 has inside meat-contact surface 33 for direct contact with, and adhesion to, the meat within the casing. If casing film 30 is used to make lap-seal casing 11 as illustrated in FIG. 1, first layer 32 is sealed to second layer 34 at backseam lap seal 13, this seal being located where a portion of outer surface 33 overlaps outside surface 35 of casing film 30. First layer 32 has the same general and preferred thickness and chemical composition as first layer 14 of FIG. 2. However, first layer 32 most preferably has a thickness of 0.8 mils.

Second layer 34 is a core layer between first layer 32 and third layer 36, and in general is analogous to second layer 16 of FIG. 2. Second layer 34 has the same general and preferred thickness and chemical composition as second layer 16 of FIG. 2.

Third film layer 36 is an outer film layer which serves as an outside, abuse-resistant heat-seal layer of casing 11. Preferably, third layer 36 is analogous to third layer 18 of FIG. 1. Third layer 36 has the same general and preferred thickness and chemical composition as third layer 18 of FIG. 1. However, third layer 36 most preferably has a thickness of about 0.8 mils.

Fourth layer 38 is an inner layer between first layer 32 and third layer 36, and in general is analogous to fourth layer 20 of FIG. 2. Fourth layer 38 has the same general and preferred thickness and chemical composition as fourth layer 20 of FIG. 2.

Fifth layer 40 is a tie layer between first layer 32 and second layer 34, and in general is analogous to fifth layer 22 of FIG. 2. Fifth layer 40 has the same general and preferred thickness and chemical composition as fifth layer 22 of FIG. 2.

Sixth layer 42 is a tie layer between second layer 34 and third layer 36, and in general is analogous to sixth layer 24 of FIG. 2. Sixth layer 42 has the same general and preferred thickness and chemical composition as sixth layer 24 of FIG. 2.

FIG. 4 illustrates an alternative preferred three-layer, heat-shrinkable, multilayer casing film 44 suitable for use as a lap-seal casing 11 as illustrated in FIG. 1. As with multilayer film 12 of FIG. 2, multi-layer film 44 is also especially suited to the packaging of meat products which are thereafter subjected to cook-in. Casing film 44 comprises first layer 46, second layer 48, and third layer 50.

First layer 46 is an outer film layer which serves as an inside casing film layer, and is a meat-contact layer which is analogous to first layer 14 of FIG. 2. When in the form of a casing, first layer 46 of multilayer film 44 has inside meat-contact surface 47 for direct contact with, and adhesion to, the meat within the casing. If casing film 44 is used to make lap-seal casing 11 as illustrated in FIG. 1, first layer 46 is sealed to third layer 50 at backseam lap seal 13, this seal being located where a portion of inside surface 47 overlaps a portion of outside surface 51 of casing film 44. Preferably, first layer 46 has the same thickness and chemical composition as first layer 14 of FIG. 2; more preferably, first layer 46 comprises a modified polyolefin for improved bonding to second layer 48; still more preferably, first layer 46 comprises anhydride-modified LLDPE as the third polyolefin. Also, more preferably, first layer 46 has a thickness of 1.0 mil.

Second layer 48 is a core layer between first layer 46 and third layer 50, and in general is analogous to second layer 16 of FIG. 2. Second layer 48 has the same general and preferred thickness and chemical composition as second layer 16 of FIG. 2.

Third layer 50 is an outer abuse-resistant layer and heat-seal layer, which is analogous to third layer 18 of FIG. 2. Preferably, third layer 50 has the same thickness and chemical composition as third layer 18 of FIG. 2. However, third layer 50 further comprises a modified polyolefin for improved bonding to second layer 48; more preferably, third layer 50 comprises, as the second polyolefin, 100 weight percent anhydride-modified LLDPE. Also, more preferably, third layer 50 has a thickness of 1.0 mil.

FIG. 5 illustrates a cross-sectional view of butt-seal backseamed casing 52, in accordance with the present invention. Butt-seal backseamed casing 52 comprises heat-shrinkable casing film 54 having abutting longitudinal edges 56 and 58, and butt-seal tape 60, one side of which is sealed to outside surface 55 of casing film 54, seals 59 and 61 being in regions adjacent to and along longitudinal edges 56 and 58. In this manner, a tubular casing is provided in which a product can be packaged, especially a meat product which is thereafter subjected to cook-in while packaged in butt-seal backseamed casing 52.

Figure 6:
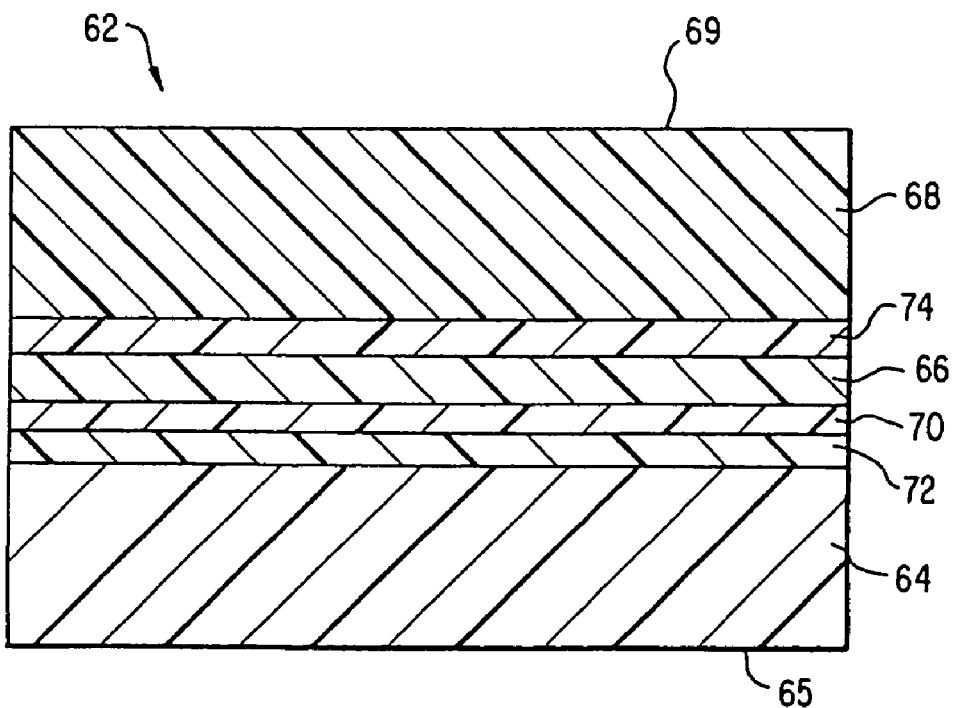
FIG. 6 illustrates an enlarged cross-sectional view of a first preferred casing film suitable for use in the butt-seal backseamed casing illustrated in FIG. 5.

FIG. 6 illustrates preferred heat-shrinkable, multilayer film 62 for use as casing film 54 in butt-seal backseamed casing 52 illustrated in FIG. 5. Multilayer film 62 comprises first layer 64, second layer 66, third layer 68, fourth layer 70, fifth layer 72, and sixth layer 74.

First film layer 64 is a meat-contact and meat adhesion which is analogous to first layer 32 of the film of FIG. 3. First film layer 64 serves as an inside casing layer, and provides meat-contact surface 65 for direct contact with, and adhesion to, meat packaged in the casing which is thereafter subjected to cook-in. Preferably, first layer 64 has the same thickness and chemical composition as first layer 32 of FIG. 3.

Second layer 66 is an inner film layer which serves as a casing core layer which reduces or eliminates necking down on the forming shoe during the backseaming operation. Second layer 66 is between first layer 64 and third layer 68, and is analogous to second layer 34 of the film of FIG. 3. Preferably, second layer 66 has the same thickness and chemical composition as second layer 34.

Third layer 68 is an outer film layer which serves as an outside casing abuse-resistance and heat-seal layer, and is analogous to third layer 36 of the film of FIG. 3. Preferably, third layer 68 has the same thickness and chemical composition as third layer 36.

Fourth layer 70 is an inner film layer which serves as an O₂-barrier layer, is between first film layer 64 and third film layer 68, and is analogous to fourth layer 38 in film 30 of FIG. 3. Preferably, fourth layer 70 has the same thickness and chemical composition as fourth layer 38.

Fifth layer 72 is an inner film layer which serves as a tie layer, and is between first film layer 64 and second film layer 66, and is analogous to fifth layer 40 in film 30 of FIG. 3. Preferably, fifth layer 72 has the same thickness and chemical composition as fifth layer 40.

Sixth layer 74 is an inner film layer which serves as a tie layer, and is between second film layer 66 and third film layer 68, and is analogous to sixth layer 42 in film 30 of FIG. 3.

Preferably, sixth layer 74 has the same thickness and chemical composition as sixth layer 42.

Figure 7:
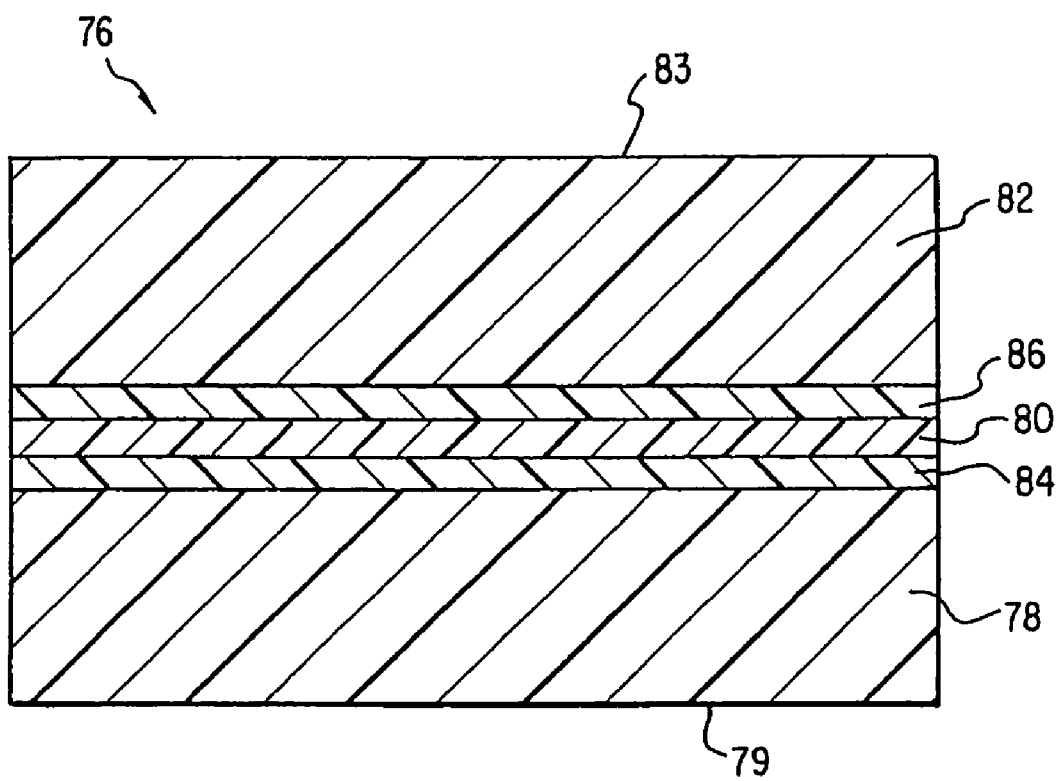
FIG. 7 illustrates an enlarged cross-sectional view of a first preferred butt-seal tape film suitable for use in the butt-seal backseamed casing illustrated in FIG. 5.

FIG. 7 illustrates preferred heat-shrinkable, multilayer film 76 for use as butt-seal tape film 60 in butt-seal backseamed casing 52 illustrated in FIG. 5. Multilayer film 76 comprises first layer 78, second layer 80, third layer 82, fourth layer 84, and fifth layer 86.

First layer 78 is an outer film layer which serves as a heat-seal layer, and is analogous to third layer 68 of film 62 illustrated in FIG. 6. First layer 78 serves as the outer layer of butt-seal tape film 60 which is sealed to outside surface 55 of casing film 54, i.e., to form seals 59 and 61 (see FIG. 5). Preferably, first layer 78 has the same thickness and chemical composition as third layer 68.

Second layer 80 is an inner film layer between first layer 78 and third layer 82, serves as an $O_2$-barrier layer, and is analogous to fourth layer 38 of multilayer film 30 illustrated in FIG. 3. Preferably, second layer 80 has the same thickness and chemical composition as fourth layer 38.

Third layer 82 is an outer film layer which serves as a butt-seal tape abuse-resistance layer, and is analogous in composition to third layer 68 of film 62 illustrated in FIG. 6. Preferably, third layer 82 has the same thickness and chemical composition as third layer 68.

Fourth layer 84 is an inner film layer which serves as a tie layer, is between first layer 78 and second layer 80, and is analogous to fifth layer 40 of film 30 illustrated in FIG. 3. Preferably, fourth layer 84 has the same thickness and chemical composition as fifth layer 40.

Fifth layer 86 is an inner film layer which serves as a tie layer, is between second layer 80 and third layer 82, and is analogous to sixth layer 42 of film 30 illustrated in FIG. 3. Preferably, fifth layer 86 has the same thickness and chemical composition as sixth layer 42.

It should be noted that the butt-seal tape film need not have a core layer of polyamide or polyester which prevents the butt-seal tape film from necking down on the forming shoe. This is due to the fact that the butt-seal tape occupies so little of the overall structure of the butt-sealed backseamed casing, that the shrinkage of the tape film during the backseaming operation has little tendency to cause necking down on the forming shoe.

Backseamed casings 11 and 52 (illustrated in FIGS. 1 and 5, respectively) which use films 12, 30, 44, 62, and 76 (illustrated in FIGS. 2, 3, 4, 6, and 7, respectively), are suited to many different forms of packaging in accordance with the present invention, including shirred casings, bags, etc.

Figure 8:
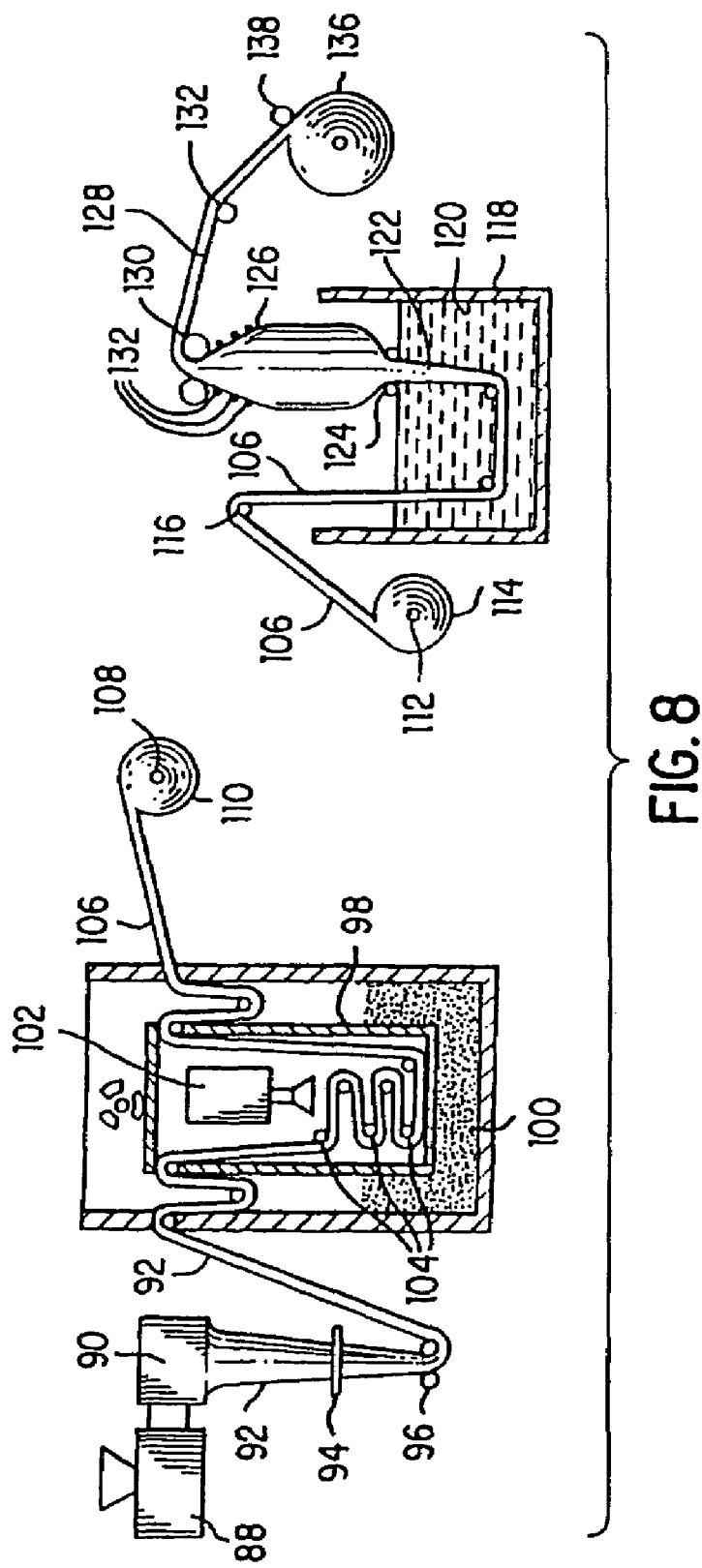
FIG. 8 illustrates a schematic view of a process for making a preferred heat-shrinkable casing film and/or butt-seal tape film, for use in a backseamed casing in accord with the present invention.

FIG. 8 illustrates a preferred process for making casing film and/or butt-seal tape film for in accordance with the present invention. For example, FIG. 8 illustrates a preferred process for making the films illustrated in FIGS. 2, 3, 4, 6, and 7. In the process illustrated in FIG. 8, solid polymer beads (not illustrated) are fed to a plurality of extruders (for simplicity, only extruder 88 is illustrated). Inside extruders 88, the polymer beads are degassed, following which the resulting bubble-free melt is forwarded into die head 90, and extruded through an annular die, resulting in tubing tape 92 which is preferably from about 15 to 30 mils thick, and preferably has a lay-flat width of from about 2 to 10 inches.

After cooling or quenching by water spray from cooling ring 94, tubing tape 92 is collapsed by pinch rolls 96, and is thereafter fed through irradiation vault 98 surrounded by shielding 100, where tubing tubing 92 is irradiated with high energy electrons (i.e., ionizing radiation) from iron core transformer accelerator 102. Tubing tape 92 is guided through irradiation vault 98 on rolls 104. Preferably, tubing tape 92 is irradiated to a level of from about 40-100 kGy, resulting in irradiated tubing tape 106. Irradiated tubing tape 106 is wound upon windup roll 108 upon emergence from irradiation vault 98, forming irradiated tubing tape coil 110.

After irradiation and windup, windup roll 108 and irradiated tubing tape coil 110 are removed and installed as unwind roll 112 and unwind tubing tape coil 114, on a second stage in the process of making the film as ultimately desired. Irradiated tubing 106, being unwound from unwind tubing tape coil 114, is then passed over guide roll 116, after which irradiated tubing 106 is passed through hot water bath tank 118 containing hot water 120. Irradiated tubing 106 is then immersed in hot water 120 (preferably having a temperature of about 185-210° F.) for a period of about 20-60, i.e., for a time period long enough to bring the film up to the desired temperature for biaxial orientation. Thereafter, hot, irradiated tubular tape 122 is directed through nip rolls 124, and bubble 126 is blown, thereby transversely stretching hot, irradiated tubular tape 122 so that an oriented film tube 128 is formed. Furthermore, while being blown, i.e., transversely stretched, nip rolls 130 have a surface speed higher than the surface speed of nip rolls 124, thereby resulting in longitudinal orientation. As a result of the transverse stretching and longitudinal drawing, oriented film tube 128 is produced, this blown tubing preferably having been both stretched in a ratio of from about 1:1.5 to 1:6, and drawn in a ratio of from about 1:1.5 to 1:6. More preferably, the stretching and drawing are each performed at a ratio of from about 1:2 to 1:4. The result is a biaxial orientation of from about 1:2.25 to 1:36, more preferably, 1:4 to 1:16. While bubble 126 is maintained between pinch rolls 124 and 130, oriented film tube 128 is collapsed by rollers 132, and thereafter conveyed through pinch rolls 130 and across guide roll 134, and then rolled onto wind-up roll 136. Idler roll 138 assures a good wind-up. The resulting multilayer film can be used to form backseamed casings, etc., which, in turn, can be used for the packaging of meat products, in accordance with the present invention.

The films of the examples set forth below were prepared according to the process described immediately above. These examples provide additional details on the backseamed casings, their use in the packaging of a meat product, and the unexpected results obtained from the use of the casing film during the backseaming process, and subsequent packaging and cook-in of the meat product.

The polymer components used to fabricate multilayer casing film and butt-seal tape film according to the present invention may also contain appropriate amounts of additives typically included in such compositions. These additives include slip agents such as talc, antioxidants, fillers, dyes, pigments, radiation stabilizers, antistatic agents, elastomers, and like additives known to those of skill in the art of packaging films.

The backseamed casings according to the present invention comprise casing films and butt-seal tape films which can be prepared by any means known to those of skill in the art, e.g., via coextrusion and/or extrusion coating, and/or lamination. However, preferably the films are produced by coextrusion.

The backseamed casing according to the present invention preferably comprises a casing film (and butt-seal tape film) which comprises a crosslinked polymer network. Although the crosslinked polymer network can be produced in one or more of a variety of manners, such as chemical crosslinking and/or irradiation, preferably the crosslinked polymer network is produced by the irradiation of a tape or film. Either some or all of the layers of the multilayer film can comprise crosslinked polymer networks.

In the irradiation process, the film is subjected to an energetic radiation treatment, such as high energy electron treatment, which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16-166 kGy, more preferably about 44-139 kGy, and still more preferably, 50-80 kGy. Preferably, irradiation is carried out by an electron accelerator and the dosage level is determined by standard dosimetry methods.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface. The ionization is initiated by a high voltage passed through a nearby electrode, causing oxidation and other changes to the film surface.

Corona treatment of polymeric materials is disclosed in U.S. Pat. No. 4,120,716, to BONET, issued Oct. 17, 1978, which is hereby incorporated in its entirety by reference thereto. BONET discloses improved adherence characteristics of polyethylene, by subjecting of the polyethylene to corona treatment, in order to oxidize the surface thereof. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web increasing the adhesion of the film to the proteinaceous material.

Although corona treatment is a method of treatment of the multilayer film of the present invention, plasma treatment of the film may also be used.

Figure 9:
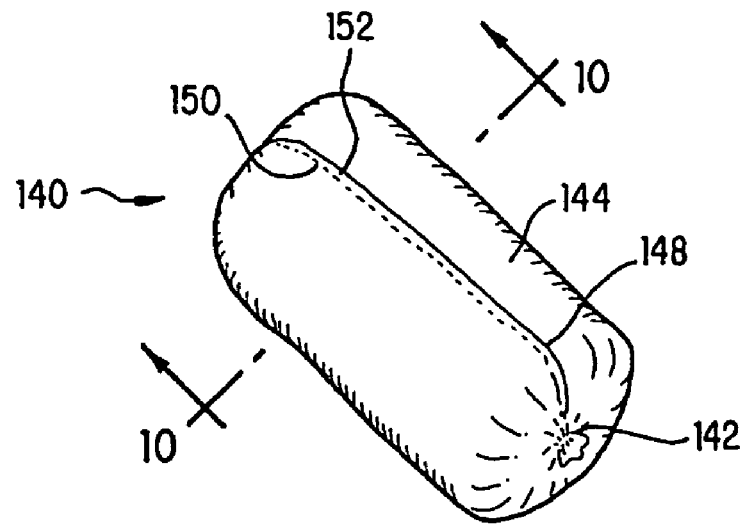
FIG. 9 illustrates a perspective view of a first package according to the present invention.
Figure 10:
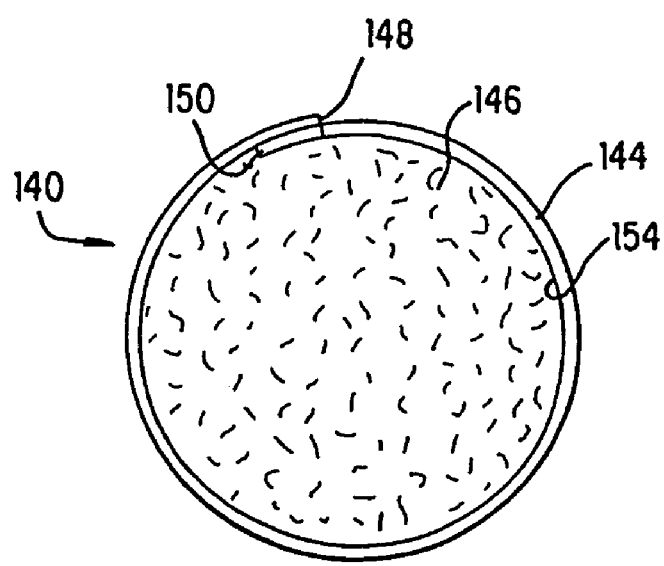
FIG. 10 illustrates a perspective view of a second package according to the present invention.

FIG. 9 illustrates a perspective view of package 140 in accordance with the present invention, and FIG. 10 illustrates a cross-sectional view through section 10-10 of FIG. 9. Package 140 comprises lap-seal casing 144 which encases meat product 146, with casing 144 being closed at both ends by clips 142, with only one clip being illustrated in FIG. 9. The lap seal portion of casing 144 comprises longitudinal outer casing film edge 148 and longitudinal inner casing film edge 150, as well as overlap region 152 which contains the backseam seal. Casing 144 comprises a multilayer casing film in accordance with the backseamed casing of the present invention. The casing film can be, for example, any one or more of preferred multilayer films 12, 30, 44, or 62, as described in detail above. Furthermore, although package 140 as illustrated comprises a lap-seal casing, alternatively the package can comprise a butt-seal casing (preferably, as illustrated in FIG. 5), in which latter instance the casing further comprises a butt-seal tape, preferably as described above and as illustrated in FIGS. 5 and 7. In FIGS. 9 and 10, product 146 in the package is preferably meat, more preferably cooked meat, and preferably inside surface 154 of casing 144 is adhered to the meat product during cook-in.

The packaged product can be made by a process comprising: (A) filling a backseamed casing with a meat product, whereby a filled casing is formed; (B) closing the ends of the filled casing so that the meat product is encased by the backseamed casing, whereby a chub is formed; and (C) cooking the meat product encased in the backseamed casing by subjecting the chub to cook-in, so that the meat product adheres to the inside surface of the casing. The backseamed casing is a backseamed casing according to the present invention, preferably a preferred backseamed casing according to the present invention.

Although in general the product in the package can be any cooked meat product, preferably the cooked meat product comprises at least one member selected from the group consisting of poultry, ham, beef, lamb, goat, horse, fish, liver sausage, mortadella, and bologna; more preferably, poultry, ham, beef and bologna; even more preferably, ham and roast beef.

The invention is illustrated by the following examples, which are provided for the purpose of representation, and are not to be construed as limiting the scope of the invention. Unless stated otherwise, all percentages, parts, etc. are by weight.

EXAMPLE 1

A 3¾ inch wide (lay flat dimension) tube, called a "tape", was produced by the coextrusion process described above and illustrated in FIG. 8, wherein the tape cross-section (from inside of tube to outside of tube) was as follows:

3.0 mils of LLDPE#1 (80%) and Ionomer #1 (20%)/
3.2 mils of a blend of EVA#1 (80%) and LMDPE#1 (20%)/
1.8 mil of anhydride grafted LLDPE#2/
1.6 mils of a blend of Nylon#1 (50%) and Nylon#2 (50%)/
0.8 mil of EVOH/
0.8 mils of anhydride grafted LLDPE#2/
2.7 mils of a blend of EVA#1 (80%) and LMDPE#1 (20%)/
3.5 mils of LLDPE #3;
wherein:

LLDPE#1 was DOWLEX® 2045.03 linear low density polyethylene, obtained from Dow Plastics, of Freeport, Tex.;

Ionomer#1 was SURLYN® 1650 zinc-based ionomer of ethylene/methacrylic acid copolymer, obtained from E.I. DuPont de Nemours, of Wilmington, Del.;

LLDPE#2 was TYMOR® 1203 linear low density polyethylene having an anhydride functionality grafted thereon, obtained from Morton International, of Chicago, Ill.;

EVA#1 was PE 5269T (™) ethylene vinyl acetate copolymer, obtained from Chevron Chemical Company of Houston, Tex.;

EVOH was EVAL® LC-E105A polymerized ethylene vinyl alcohol, obtained from Eval Company of America, of Lisle, Ill.;

LMDPE#1 was DOWLEX® 2037 linear medium density polyethylene, obtained from Dow Plastics, of Freeport, Tex.;

NYLON#1 was ULTRAMID® B4 polyamide 6, obtained from BASF corporation of Parsippany, N.J.;

NYLON#2 was GRILON® CF6S polyamide 6/12, obtained from EMS-American Grilon Inc., of Sumter, S.C.;

LLDPE#3 was DOWLEX® 2244A linear low density polyethylene, obtained from Dow Plastics of Freeport, Tex.;

All the resins were extruded between 380° F. and 500° F., and the die was heated to approximately 420° F. The extruded tape was cooled with water and flattened, the flattened width being 3¾ inches wide in a lay-flat configuration. The tape was then passed through a scanned beam of an electronic crosslinking unit, where it received a total dosage of 64 kilo Grays (kGy), which is the equivalent of 4.5 mega Rads (MR). After irradiation, the flattened tape was passed through hot water for about a third of a minute, the hot water having a temperature of from about 208° F. to 210° F. The resulting heated tape was inflated into a bubble and oriented into a film tubing having a lay-flat width of 9¾ inches and a total thickness of 2.3 mils. The bubble was very stable and the optics and appearance of the film were good. The film tubing was determined to have 18% free shrinkage in the longitudinal direction and 29% free shrinkage in the transverse direction, when immersed in hot water for about 8 seconds, the hot water being at a temperature of 185° F., i.e., using ASTM method D2732-83.

The film tubing, made as described immediately above, was then slit so that it was converted into film sheet. The film sheet was folded longitudinally around a forming shoe with opposing lengthwise film sheet edges being overlapped. Thereafter, a lap-seal backseam casing was made by applying a heat seal (using a hot seal bar, more particularly a Nishibe Model HSP-250-SA sealing machine) longitudinally over the overlapping regions of the film sheet. During the backseaming operation, the film was positioned so that the outside layer of the film tubing (before it was slit) formed the outside layer of the backseamed casing, with the inside layer of the film tubing forming the inside layer of the backseamed casing. The film backseamed well, i.e., without necking down around the forming shoe to the extent that the film ruptured or the process was interrupted.

The resulting backseamed casing, having with a lay-flat width of about 4 inches, was then clipped at one end and filled with chopped ham emulsion from the open end. The casing was then closed with a second metal clip and the section of meat-filled casing was cut free of the remainder of the casing, forming a package which comprises the lap-seal backseamed casing and the ham emulsion encased in the casing. Several such packages were produced, and were thereafter cooked for about 4 hours at from about 145° F.-170° F. in a high humidity environment. The cooked casings were then cooled in a cooler kept at 32° F. for several hours. The resulting chilled packages were then examined for purge and found to have no purge between the cooked meat product and the casing film. Also, several samples of backseamed casing were made, each containing water as the packaged medium, and a mixture of 0.1% mineral oil and 99.9% water. These casings were evaluated for seal strength survivability by cooking at 180° F. for 12 hrs, and were found to have acceptable seal strength.

The backseamed casing was also shirred. The shirred casings were found to have acceptable seal strength, with very few or no pinholes being detected.

EXAMPLE 2

A 3¾ inch wide (lay flat dimension) tape is produced by the coextrusion process described above in FIG. 8, wherein the tape cross-section (from inside to outside) is as follows:
  6.0 mils of LLDPE#3 (80%) and ION#1 (20%)/
  1.1 mil of anhydride grafted LLDPE#2/
  2.0 mils of a blend of Nylon#1 (50%) and Nylon#2 (50%)/
  1.1 mil of EVOH/
  1.1 mils of anhydride grafted LLDPE#2/
  6.0 mils of LLDPE #3, wherein all the resins are as identified in Example 1 above. All the resins are extruded at a temperature of from about 380° F. to 500° F., and the die is at approximately 420° F. The extruded tape is cooled with water and flattened, the flattened width being 3¾ inches wide, in a lay-flat configuration. The tape is then passed through a scanned beam of an electronic cross-linking unit, where it receives a total dosage of 64 kilo Grays (kGy), which is the equivalent of 4.5 mega Rads (MR). After irradiation, the flattened tape is passed through hot water at 208° F. to 210° F. for a period of about a third of a minute, immediately after which the heated tape is inflated into a bubble, and is oriented into tubing having a lay-flat width of 9¾ inches and a total thickness of 2.3 mils. The bubble is stable and the optics and appearance of the film are good. The resulting film has 18% free shrinkage in the longitudinal direction and 29% free shrinkage in the transverse direction when it is immersed in hot water at 185° F., i.e., using ASTM method D2732-83.

The film tubing, made as described immediately above, is then slit lengthwise, converting the film tubing into film sheet. The film sheet is folded longitudinally around a forming shoe with longitudinally opposing edges being overlapped, with the overlapping regions thereafter being joined by applying a heat seal, using a hot-seal bar, longitudinally over the overlap, to form a lap seal using a Nishibe Model HSP-250-SA sealing machine. During the backseaming operation, the film is positioned so that the outside layer of the film tubing (before it is slit) corresponds with the outside layer of the backseamed casing, with the inside layer of the film tubing corresponding with the inside layer of the backseamed casing. The film backseams well.

The resulting backseamed casing, having a lay-flat width of about 4 inches, is then clipped at one end and filled with chopped ham emulsion from the open end. The tubing is then closed with a second metal clip and the section of meat-filled casing is cut free of the remainder of the casing, forming a package which comprises the lap-seal backseamed casing and the ham emulsion encased in the casing. Several packages are so made. Each of the packages is cooked for about 4 hours from 145° F.-170° F. in a high humidity environment. The cooked packages are then cooled in a cooler kept at 32° F. for several hours. The resulting cooked, chilled packages are examined for purge and found to have no purge between the cooked meat product and the inside surface of the backseamed casing.

Several additional packages are made from the backseamed casing, each of these packages containing a product comprising 99.9% water and 0.1% mineral oil. These casings are evaluated for seal strength survivability by cooking at 180° F. for 12 hours, and are found to have acceptable seal strength.

EXAMPLE 3

A 3¾ inch wide (lay flat dimension) tubular tape is produced according to Example 1. The tape cross-section (from inside of tube to outside of tube) is as follows:
  6.0 mils of Terpolyolefin#1/
  1.1 mil of anhydride grafted LLDPE#2/
  2.0 mils of a blend of Nylon#1 (50%) and Nylon#2 (50%)/
  1.1 mils of EVOH/
  1.1 mils of anhydride grafted LLDPE#2/
  6.0 mils of LLDPE #3, wherein:
  Terpolyolefin#1 is LOTADER® 3210 ethylene/butyl acrylate/maleic anhydride terpolymer, comprising about 3% anhydride functionality, obtained from Elf Atochem North America, Inc., of Philadelphia, Pa., and all the other resins are as identified in Example 1 above.

All the resins are extruded between 380° F. and 500° F., and the die is at approximately 420° F. The extruded tape is cooled with water and flattened, the flattened width being 3¾ inches wide, in a lay-flat configuration. The tape is then passed through a scanned beam of an electronic cross-linking unit, where it receives a total dosage of 64 kilo Grays (kGy), which is the equivalent of 4.5 mega Rads (MR). After irradiation, the flattened tape is passed through hot water at 208° F. to 210° F., inflated into a bubble, and oriented into tubing having a lay-flat width of 9¾ inches and a total thickness of 2.3 mils. The bubble is stable and the optics and appearance of the resulting tubing film are good. The tubing film has 18% free shrinkage in the longitudinal direction and 29% free shrinkage in the transverse direction, when immersed in hot water for 8 seconds at 185° F., i.e., according to ASTM method D2732-83.

The tubing film is then slit into film. The film is folded longitudinally around a forming shoe with opposing longitudinal edges being overlapped, with the overlapping regions then being joined by applying a heat seal (using a hot-seal bar) longitudinally over the overlap, to form a lap-seal backseamed casing, using a Nishibe Model HSP-250-SA sealing machine. During the backseaming operation, the film is positioned so that the layer which corresponds with the outside layer of the film tubing (before it is slit) forms the outside layer of the resulting backseamed casing, with the layer which corresponds with the inside layer of the film tubing forms the inside layer of the resulting lap-seal backseamed casing. The film backseams well, i.e., without necking down on the forming shoe to the extent that the film either ruptures or interrupts the process.

This resulting backseamed casing, having a lay-flat width of about 4 inches, is then clipped at one end and filled from the open end with chopped ham emulsion. The tubing is then closed with a second metal clip, resulting in a package, with the package thereafter being cooked for about 4 hours from 145° F.-170° F. in a high humidity environment. The packages containing cooked ham emulsion are then cooled in a cooler for several hours, the cooler having a temperature of about 32° F. The resulting chilled packages are then examined for purge and found to have no purge between the product and the plastic material.

Several other backseamed casings are filled with a mixture of 99.9% water and 0.1% mineral oil. These casings are evaluated for seal strength survivability by cooking at 180° F. for 12 hrs, and are found to have acceptable seal strength.

EXAMPLE 4

A 3¾ inch wide (lay flat dimension) annular tape, was produced by the coextrusion process described above and illustrated in FIG. 5, wherein the tape cross-section (from inside to outside) was as follows:
 2.8 mils of EMAA#1/
 3.3 mils of a blend of EVA#1 (80%) and HDPE#1 (20%)/
 0.9 mils of anhydride grafted LLDPE#2/
 1.8 mils of a blend of Nylon#1 (50%) and Nylon#2 (50%)/
 1.1 mils of EVOH/
 1.6 mils of anhydride grafted LLDPE#2/
 2.2 mils of a blend of EVA#1 (80%) and HDPE#1 (20%)/
 3.1 mils of LLDPE #3,
 wherein:
 EMAA#1 was NUCREL® ARX 84-2 ethylene/methacrylic acid copolymer, obtained from E. I. DuPont de Nemours, of Wilmington, Del.;
 HDPE#1 is FORTIFLEX® J60-500C-147 high density polyethylene, obtained from Solvay Polymers, Inc., Deer Park, Tex.; and
 all other resins are as identified in Example 1 above.

All the resins were extruded at a temperature of from about 380° F. to 500° F., and the die was heated to approximately 420° F. The extruded tape was cooled with water and flattened, the flattened width being 3¾ inches wide, in a lay-flat configuration. The tape was then passed through a scanned beam of an electronic cross-lining unit, where it received a total dosage of 64 kilo Grays (kGy), which is the equivalent of 4.5 mega Rads (MR). After irradiation, the flattened tape was passed through hot water at 208° F. to 210° F., inflated into a bubble, and oriented into film tubing having a lay-flat width of 9¾ inches and a total thickness of 2.3 mils. The bubble was very stable and the optics and appearance of the film tubing were good. The resulting film tubing had 18% free shrinkage in the longitudinal direction and 29% free shrinkage in the transverse direction, when immersed for 8 seconds in hot water at 185° F., i.e., using ASTM method D2732-83.

The film tubing, made as described immediately above, was then slit longitudinally, thereby converting the film tubing into film sheet. The film sheet was folded longitudinally around a forming shoe, with opposing longitudinal edges being overlapped, with the overlapping regions of the film sheet thereafter being joined by applying a heat seal (using a hot-seal bar) longitudinally over the overlap, using a Nishibe Model HSP-250-SA sealing machine. During the backseaming operation, the film was positioned so that the outside layer of the film tubing (before it was slit) corresponds to the outside layer of the resulting backseamed casing, with the inside layer of the film tubing corresponding to the inside layer of the backseamed casing. The film backseamed well and appeared to have acceptable seal strength. The film was also evaluated for protein adhesion and found to have satisfactory purge resistance with an intermediate quality ham product.

EXAMPLE 5

A 5¾ inch wide (lay flat dimension) annular tape was produced by the coextrusion process described above and illustrated in FIG. 8, wherein the tape cross-section (from inside the tube to outside the tube) was as follows:
 3.0 mils of LLDPE#3 (80%) and EAA#1 (20%)/
 3.4 mils of a blend of EVA#1 (60%), HDPE#1 (20%) and PIG#1 (20%)/
 1.2 mil of anhydride grafted LLDPE#2/
 1.7 mils of a blend of Nylon#1 (50%) and Nylon#2 (50%)/
 1.0 mils of EVOH/
 1.1 mils of anhydride grafted LLDPE#2
 2.7 mils of a blend of EVA#1 (60%), EAA#1 (20%) and PIG#1 (20%)/
 3.4 mils of LLDPE #3,
 wherein:
 EAA#1 is PRIMACOR® 1410 ethylene/acrylic acid copolymer, obtained from The Dow Chemical Company, of Midland, Mich.;
 PIG#1 is EPE 10214-C opaque white color concentrate, obtained from Teknor Color Company, of Pawtucket, R.I.;
 all other resins were as identified in Examples 1-4, above.

All the resins were extruded at a temperature of from about 380° F. to 500° F., and the die was heated to approximately 420° F. The extruded tape was cooled with water and flattened, the flattened width being 5¾ inches, in a lay-flat configuration. The tape was then passed through a scanned beam of an electronic cross-linking unit, where it received a total dosage of 64 kilo Grays (kGy), which is the equivalent of 4.5 mega Rads (MR). After irradiation, the flattened tape was passed through hot water for about a third of a minute, the hot water having a temperature of from about 208° F. to 210° F. Immediately upon emerging from the hot water bath, the heated tape was inflated into a bubble, and oriented into a film tubing having a lay-flat width of 15 inches and a total thickness of 2.3 mils. The bubble was very stable and the optics and appearance of the film tubing were good. The resulting film tubing had 18% free shrinkage in the longitudinal direction and 29% free shrinkage in the transverse direction when immersed in hot water at 185° F. for 8 seconds, i.e., using ASTM method D2732-83.

The tubing, made as described immediately above, was then slit into film, and was converted into a lap-seal backseamed casing in the manner described in Example 1, above. The film backseamed very well.

The lap-seal backseamed casing, having a lay-flat width of about 4 inches, was then clipped at one end and filled with chopped ham emulsion from the open end. The casing was then closed with a second metal clip, and the section of meat-filled casing is cut free of the remainder of the casing, forming a package which comprises the lap-seal backseamed casing and the ham emulsion encased in the casing. Several packages were produced in this manner, with the packages thereafter being cooked for about 4 hours at a temperature of from 145° F. to 170° F., in a high humidity environment. The resulting cooked casings were then cooled in a cooler kept at 32° F. for several hours. The resulting chilled casings were then examined for purge and found to have no purge between the product and the plastic material.

Several additional packages were produced, these additional packages using the same backseamed casing, but encasing a product containing 99.9% water and 0.1% mineral oil. These casings were evaluated for seal strength survivability by cooking at 180° F. for 12 hrs, and were found to have acceptable seal strength.

The slit film was also corona-treated to a surface energy level of 62 dynes/cm, and then immediately folded (and overlapped) longitudinally about a second forming shoe having a size so that the resulting lap-seal backseamed casing had a lay-flat width of about 5¼ inches. This backseamed casing was then clipped at one end and filled with liver sausage emulsion from the open end. The casing was then closed with a second metal clip, and the section of meat-filled casing was cut free of the remainder of the casing, forming a package which comprised the lap-seal backseamed casing and the liver sausage emulsion encased in the casing. Several packages were produced in this manner, with the packages thereafter being cooked for about 4 hours from 145° F.-170° F. in a high humidity environment. The resulting packages containing cooked meat were then cooled in a cooler kept at 32° F. for several hours. The resulting chilled packages were then examined for purge and found to have good purge-resistance at the casing lay-flat edges, i.e., where the edges had rubbed against the forming shoe. Thus, even though the corona treatment at the casing lay-flat edges had been 'buffed off', there was still sufficient affinity of the untreated meat-contact surface of the casing (comprising ethylene/acrylic acid copolymer) to the liver sausage to prevent fatting out at that location.

The above backseamed casing was also shirred. The shirred casings were found to have acceptable seal strength, with very few or no pinholes being detected.

EXAMPLE 6

A 5-inch tape was produced by the coextrusion process described above and illustrated in FIG. 8, wherein the tape cross-section (from inside of tube to outside of tube) was as follows:

3.0 mils of LLDPE #4/
5.0 mils of a blend of EVA#2 (80%) and LLDPE #1 (20%)/
1.0 mil of anhydride grafted LLDPE#2/
2.5 mils of Nylon#2/
1.1 mils of EVOH/
1.6 mils of anhydride grafted LLDPE#2/
2.4 mils of a blend of EVA#2 (80%) and LLDPE#1 (20%)/
3.0 mils of LLDPE #3, and
wherein:

LLDPE#4 was PLEXAR® PX 360 anhydride grafted linear low density polyethylene, obtained from Quantum Chemical Company, of Cincinnati, Ohio;

EVA#2 was ELVAX® 3128 ethylene/vinyl acetate copolymer, obtained from E. I. DuPont de Nemours & Co., of Wilmington, Del.; and and all other the resins are as identified in Examples 1-5, above.

The tape was made and oriented into 15-inch wide tubing film in the manner described in Example 1, above. One significant difference between this film and the films of Examples 1-5 is that the film of this example has a core layer comprising only Nylon #2, i.e., nylon 6/12, rather than containing the blend of nylon 6 and nylon 6/12. The tape oriented acceptably, though it's orientability was/is significantly inferior to that of the tapes of Examples 1-5.

The film tubing was converted into film sheet, which in turn was converted into lap-seal backseamed casing in the manner described in Example 1, above. The film backseamed acceptably, though not as well as the films of Examples 1-5. Also, when evaluated for seal strength, it was/is discovered that, while the backseamed tubing of this example probably had acceptable seal strength, it's seal strength was/is inferior to that of the films of Examples 1-5.

EXAMPLE 7 (COMPARATIVE)

A 5⅛ inch, lay-flat width, annular tape was produced by the coextrusion process described above and illustrated in FIG. 8, wherein the tape cross-section (from inside the tube to outside the tube) was as follows:

3.2 mils of LLDPE #4/
5.2 mils of a blend of EVA#2 (65%), LLDPE #1 (20%) and PIG#1 (15%)/
0.9 mils of anhydride grafted LLDPE#2/
0.7 mils of a blend of Nylon#1 (50%) and Nylon#2 (50%)/
1.1 mil of EVOH/
1.7 mils of anhydride grafted LLDPE#2/
1.9 mils of a blend of EVA#2 (65%), LLDPE#1 (20%) and PIG#1 (15%)/
3.2 mils of LLDPE#3,
wherein all the resins are as identified in Examples 1-6 above.

All the resins were extruded at a temperature of from about 380° F. and 530° F., and the die was heated to approximately 420° F. The extruded tape was cooled with water and flattened, and had a width of about 5⅛ inches. This tape was then passed through the scanned beam of an electronic crosslinkig unit where the tape received a total dosage of 64 kGy. After irradiation, the flattened tape was passed through hot water for about a third of a minute, the hot water having a temperature of from about 204° F. to 210° F. The resulting heated tape was then inflated into a bubble in a manner so that the heated tape was converted into a biaxially oriented film tubing. The oriented film tubing had a lay-flat width of 15 inches. The multilayer film having a total thickness of 2.3 mils, and a free shrink in the longitudinal direction of about 18 percent, and 29 percent in the transverse direction. Free shrink was determined by immersing the film in hot water at 185° F. for about 8 seconds, i.e., using ASTM method D2732-83.

The tubing, made as described immediately above, was then slit into film. The film was folded longitudinally about a forming shoe with opposed edges being joined by applying a heat seal longitudinally over the overlapping regions of the film, in an attempt to form a lap seal using a Nishibe Model HSP-250-SA sealing machine. During the backseaming operation, the film was positioned so that the outside layer of the tubing (before it was slit) corresponded with the outside layer of the backseamed tubing, with the inside layer of the tubing corresponding with the inside layer of the backseamed tubing. However, during this backseaming step, the film necked down a substantial degree on the forming shoe, resulting in intermittent film rupture. Thus, the film was not backseamable.

EXAMPLE 8 (COMPARATIVE)

A 3½ inch lay-flat annular tape was produced by the coextrusion process described above and illustrated in FIG. 8, wherein the tape cross-section (from inside of tube to outside of tube) was as follows:
 3.2 mils of LLDPE #4/
 4.9 mils of a blend of EVA#2 (65%), LLDPE #1 (20%) and PIG#1 (15%)/
 1.0 mil of anhydride grafted LLDPE#2/
 2.5 mils of a blend of Nylon#1 (50%) and Nylon#2 (50%)/
 1.2 mil of EVOH/
 1.6 mils of anhydride grafted LLDPE#2/
 1.9 mils of a blend of EVA#2 (65%), LLDPE#1 (20%), and PIG#1 (15%)/
 3.2 mils of LLDPE #3,
 wherein all resins are as identified in Example 7 (Comparative), as set forth above.

The tape was made and oriented into 10 inch tubing film in a manner as described above in Example 7 (Comparative). The only substantial difference between the film of this example and the film of Example 7 (Comparative) is the thickness of the nylon core layer, i.e., in this example, the nylon core layer was about 3½ times as thick as the thickness of the nylon core layer in the film of Example 7 (Comparative).

The resulting film tubing was converted into film sheet and was thereafter further converted into a backseamed casing, these conversion processes being carried out in the same manner as set forth in Example 7 (Comparative), above. However, contrary to the film of Example 7 (Comparative), this film did not undergo substantial necking down on the forming shoe, and underwent backseaming successfully.

Nevertheless, the resulting backseamed casing of this example is not an example of the present invention because it does not have sufficient purge resistance. However, this example demonstrated that a minimum thickness of the nylon core layer is critical to the backseamability of a heat-shrinkable film.

The backseamed casing was also shirred. The shirred casings were found to have acceptable seal strength, with very few or no pinholes being detected.

EXAMPLE 9 (COMPARATIVE)

A 5⅛ inch tubular tape was produced by the coextrusion process described above and illustrated in FIG. 8, wherein the tape cross-section (from inside of tube to outside of tube) was as follows:
 3.0 mils of a blend of LLDPE #4 (90%) and NYLON#2 (10%)/
 5.2 mils of a blend of LLDPE #2 (80%) and EAO#1 (25%)/
 2.0 mil of anhydride grafted LLDPE#2/
 1.1 mil of EVOH/
 1.7 mils of anhydride grafted LLDPE#2/
 3.2 mils of a blend of LLDPE#2 (80%) and EAO#1 (20%)/
 3.0 mils of LLDPE#3,
 wherein EAO#1 was EXACT 4011 (™) homogeneous ethylene/alpha-olefin copolymer, obtained from the Exxon Chemical Company, of Baytown, Tex.; and all other resins are as identified in Examples 1-5 and Comparatives 1-2 above.

All the resins were extruded at a temperature of from about 380° F. to 530° F., and the die was at a temperature of about 420° F. The extruded tape was cooled with water and flattened, the flattened width being 5⅛ inches. This tape was then passed through the scanned beam of an electronic crosslinking unit where it received a total dosage of 64 kGy. After irradiation, the flattened tape was passed through hot water for about a third of a minute, the hot water having a temperature of from about 204° F. to 210° F. Upon emerging from the hot water, the resulting heated tape was immediately inflated into a bubble, and oriented to result in an oriented film tube having a lay-flat width of 14 inches. This film had a total thickness of 2.3 mils. The tape did not orient as well as the films described in Example 1, 4, 5, 7 (comparative), and 8 (comparative), due to the absence of the nylon core layer. The film had a free shrink of about 25 percent in the longitudinal direction, and about 29 percent in the transverse direction. Free shrink was determined by immersing the film in hot water for about 8 seconds, the water having a temperature of about 185° F., i.e., using ASTM method D2732-83.

The tubing film was converted into film sheet which was backseamed as described in Example 1. However, during backseaming the film necked down severely on the forming shoe (much more severely than in the case of Example 7 (Comparative), thereby rupturing itself and disrupting the process. Thus, this film was not a viable backseamable film. Thus, not only did the absence of the nylon core layer affect orientability of the film, but the resulting film also was not backseamable. This comparative example highlights the importance of the nylon core layer, for backseaming as well as orientability.

EXAMPLE 10 (COMPARATIVE)

A 5⅛ inch tubular tape was produced by the coextrusion process as described above and illustrated in FIG. 8, wherein the tape cross-section (from inside the tube to outside the tube) was as follows:
 3.0 mils of a blend of LLDPE#4 (80%) and NYLON#2 (20%)/
 6.0 mils of a blend of LLDPE#2 (80%) and EAO#1 (20%)/
 1.0 mil of anhydride grafted LLDPE#2/
 1.6 mils of a blend of NYLON#1 (50%) and NYLON#2 (50%)/
 1.0 mil of EVOH/
 1.7 mils of anhydride grafted LLDPE#2/
 3.0 mils of a blend of LLDPE#2 (80%) and EAO#1 (20%)/
 3.0 mils of LLDPE#3, wherein all resins are as identified in Examples 1-9 above. The tape was coextruded and oriented into 14 inch wide tubing film as described above in Example 9 (Comparative). The only substantial difference between this film and the film of Example 9 (Comparative) was the incorporation of the nylon core layer in the film of this example. The film oriented acceptably and far superior to the film of Example 9 (Comparative). The tubing was then slit into film and was backseamed by a process as described in Example 1 above. The film backseamed well, and exhibited good seal strength.

However, even though the film of this example backseamed acceptably, it is not a preferred film because it exhibited insufficient protein adhesion, i.e., insufficient purge-resistance. However, a comparison of the backseamability of this film with the backseamability and orientability of the film of Example 9 (Comparative), indicate that the presence of the nylon core layer is critical to both backseamability and orientability of the resulting heat-shrinkable film.

EXAMPLE 11 (COMPARATIVE)

A 5-inch tubular tape was produced by the coextrusion process described above and illustrated in FIG. 8, wherein the tape cross-section (from inside the tube to outside the tube) was as follows:

3.2 mils of LLDPE #4/
4.6 mils of a blend of EVA#2 (80%) and LLDPE #1 (20%)/
1.0 mil of anhydride grafted LLDPE#2/
1.9 mils of a blend of Nylon#1 (50%) and Nylon#2 (50%)/
1.1 mil of EVOH/
1.9 mils of anhydride grafted LLDPE#2/
3.2 mils of a blend of EVA#2 (80%) and LLDPE#1 (20%)/
3.1 mils of LLDPE #3, and wherein all the resins are as identified in Example 7 (Comparative), above. The tape was made and oriented into 15 inch lay-flat width film tubing in the manner described above in Example 8 (Comparative). The only substantial difference between this film of this example and the film of Example 8 (Comparative) is that the film of this example was pigmented. The film was converted into film sheet and was backseamed as described in Example 1, above. The film sheet backseamed well. The backseamed casing was then used to prepare a number of packages which contained intermediate quality ham emulsion. The ham emulsion was prepared, cooked, and chilled in the manner described in Example 1. The resulting chilled packages were found to have significant and unacceptable purge between the meat-contact surface and the cooked meat product. Thus, this example indicates that the protein-adhesion characteristic of Plexar® PX 360 anhydride-containing polyolefin resin, which comprises less than about ½% anhydride functionality, is insufficient for purge resistance with intermediate or poor quality ham products, i.e., products which are relatively low in protein, and are therefore more difficult for obtaining film-to-meat adhesion. The ham product was the same as the ham product used in Example 1.

The film sheet was also corona-treated to a surface energy level of 62 dynes/cm, and thereafter backseamed, with the resulting backseamed casing being used as described immediately above, i.e., to package intermediate quality ham product. In an examination of the chilled casings, purge was found at areas of the casing corresponding to the lay-flat edges, i.e., where the edges had rubbed against the forming shoe, thereby causing insufficient protein adhesion. The rubbing of the edges on the forming shoe presumably "buffed" the corona treated surface at that location. The buffing off of the corona treatment by the forming shoe resulted in too little purge resistance. Without corona treatment, the purge-resistance afforded by the anhydride-containing meat-contact resin (Plexar® PX360, which comprises less than 1% anhydride functionality), without corona treatment (since it had been buffed off), is insufficient to prevent fatting out. The liver sausage product used is the same product used in the liver sausage cook-testing of Example 5.

The backseamed casing was also shirred. The shirred casings were found to have acceptable seal strength, with very few or no pinholes being detected.

EXAMPLE 12 (COMPARATIVE)

A 4-inch tape was produced by the coextrusion process described above in FIG. 8 wherein the tape cross-section (from inside of tube to outside of tube) was as follows:

3.0 mils of EPC#1/
5.0 mils of a blend of EVA#3 (70%) and EAO#2 (30%)/
1.4 mil of anhydride grafted LLDPE#2/
1.2 mils of EVOH/
1.3 mils of anhydride grafted LLDPE#2/
5.0 mils of EPC#1,
and wherein:

EPC#1 was ELTEX P KS409, a propylene/ethylene copolymer, obtained from from Solvay Polymers, Inc., of Deer Park, Tex.

EVA#3 was PE1651CS28, 6.5% EVA copolymer, obtained from Rexene Corporation, of Dallas, Tex.

EAO#2 was TAFMER (™) P-0480, an ethylene/propylene copolymer, obtained from Mitsui Petrochemical Industries, Ltd., of Tokyo, Japan; and all the other resins are as identified in Example 1 above.

The tape was made and oriented into 12 inch wide tubing film in a manner as described in Example 1, above. The tape oriented acceptably, though the orientability of the tape was inferior to the orientability of the tape of Example 1, probably because the tape of Example 1 contained a core layer comprising nylon.

The casing film, made as described immediately above, was then slit into film sheet. The film sheet was then corona treated on a flat-sheet corona treated to achieve a surface energy level of about 48 dynes/cm on the inside layer of the tubing film, i.e., the outer film layer which was to form the corona-treated inside layer of the casing. After corona treating, the film sheet was folded longitudinally about a forming shoe with opposing edges being overlapped as described above. The resulting overlapping region of the film was then joined by applying a heat seal longitudinally to the overlap, to form a lap seal, using a Nishibe Model HSP-250-SA sealing machine. During the backseaming operation, the film was positioned so that the corona-treated surface formed the inside layer of the resulting lap-seal casing. Although the film did not contain a core layer comprising nylon and/or polyester, the film backseamed acceptably. It is believed that the presence of the outer film layers comprising propylene/ethylene copolymer assisted in preventing the film from shrinking back so tightly against the forming shoe that the process would have been interrupted.

The backseamed casing was then used to prepare a number of packages which contained liver sausage. The packages were prepared, cooked, and chilled in the manner described in Example 1. While the lap-seal backseamed casing was found to have reasonable seal strength, it was not as preferred as the casing of the present invention, due to less seal strength during cook-in, and more seal pucker after cook-in, compared with the casing films of Examples 1 and 5. Furthermore, it was found that during cook-in fatting out occurred at regions corresponding with the casing lay-flat edges, i.e., where the corona-treatment had been buffed off by the forming shoe.

EXAMPLE 13

A 5-inch tape was produced by the coextrusion process described above and illustrated in FIG. 8, wherein the tape cross-section (from inside of tube to outside of tube) was as follows:

3.7 mils of a blend of EPC#2 and EAO#3/
2.7 mils of anhydride grafted LLDPE#2/
2.0 mils of Nylon#2/
1.0 mils of EVOH/
2.6 mils of anhydride grafted LLDPE#2/
4.0 mils of a blend of EPC#2 and EAO#3,
and wherein:

EPC#2 was NOBLEN (™) W531D propylene/ethylene copolymer, obtained from Sumitomo Chemical Company, Limited, of Tokyo, Japan;

EAO#3 was TAFMER (™)A-4085, an ethylene-butene copolymer obtained from Mitsui Petrochemical Industries, Ltd., of Tokyo, Japan; and all the other resins are as identified in Example 1 above.

The tape was made and oriented into 14-inch wide tubing film in a manner as described in Example 1, above. The tape oriented acceptably, though the orientability of the tape was inferior to the orientability of the tape of Example 1, probably because the tape of Example 1 contained a core layer comprising a more preferred nylon composition.

The casing film, made as described immediately above, was then slit into film sheet and corona treated and backseamed in the manner described in Example 12, above. The film backseamed acceptably. After making chubs from the casing film packed with liver sausage and subjecting the chubs to cook-in as described in Example 12, the lap-seal backseamed casing was found to have reasonable seal strength, it was not as preferred as the casing of the present invention, due to less seal strength during cook-in, and more seal pucker after cook-in, compared with the casing films of Examples 1 and 5. Furthermore, it was found that during cook-in fatting out occurred at regions corresponding with the casing lay-flat edges, i.e., where the corona-treatment had been buffed off by the forming shoe.

EXAMPLE 14

A 5½-inch tape was produced by the coextrusion process described above in FIG. 8 wherein the tape cross-section (from inside of tube to outside of tube) was as follows:

2.8 mils of EPC#1/
5.9 mils of a blend of EVA#3 (70%) and EAO#2 (30%)/
1.5 mil of anhydride grafted LLDPE#2/
1.2 mils of EVOH/
3.0 mils of NYLON#2/
0.9 mils of anhydride grafted LLDPE#2/
2.4 mils of a blend of EVA#3 (70%) and EAO#2 (30%)/
2.9 mils of EPC#1,
and wherein:
all the resins are as identified in Example 1 & 7 above.

The tape was made and oriented into 16-inch wide tubing film by a process as described above in Example 1. Although the tape oriented acceptably, the orientability of the tape was inferior to the orientability of the tape of Example 1, probably because the tape of Example 1 contained a core layer comprising a more preferred nylon composition.

The casing film, made as described immediately above, was then slit into film sheet and corona treated and backseamed in the manner described in Example 12, above. The film backseamed acceptably. The resulting lap-seal backseamed casing was then shirred, with the shirred casing then being evaluated for seal strength. The results indicated that while the seal strength of the shirred casings was good, the shirring process resulted in a low but more than preferred rate of formation of pinholes alongside the backseam.

The results obtained from Examples 1-6, which are according to the present invention, as well as the results obtained from Examples 7-14, reveal several important and unexpected results obtained by the present invention.

First, it has been discovered that a core layer of nylon substantially reduces, or prevents, film neck-down on the forming shoe during the backseaming process, so long as the nylon core layer has at least a certain minimum thickness. While the amount of nylon needed probably depends on a variety of factors, such as composition of the remainder of the film, overall physical properties, etc., it appears that the nylon layer needs to have a thickness of at least about 5%, based on the total thickness of the multilayer film, if necking down on the forming shoe is to be substantially reduced or prevented.

Second, the selection of the type of nylon can have a significant impact on the performance of the film, not just with regard to backseamability, but also with regard to other desired characteristics, such as improved orientability, improved sealability, improved seal strength, and improved pinhole-resistance. Whereas seal strength is simply the strength of the seal as measured by ability to withstand cook-in, sealability is the ease of sealing, i.e., incorporates a sealing window temperature, seal consistency between batches, and seal reliability during cook-in. For example, a comparison of the performance of the backseamed casings according to Example 6 versus Example 11 reveals that the core layer of a blend of nylon 6 (50%) and nylon 6/12 (50%), provides better tape orientability, better sealability, better backseamability, and better seal strength. The influence of the nylon core layer on backseamability is unexpected in that it cannot be explained by the modulus, free shrink, or shrink force imparted by the nylon-containing layer. Moreover, the significant influence of the nylon core layer on seal strength is unexpected in that the nylon core layer is not serving as a sealant layer.

Third, a comparison of Examples 12-14 with themselves and with Examples 1-11 indicates several advantages of the backseamed casing according to the present invention. First, although the core layer comprising polyester and/or first nylon, or first nylon having a melting point of at least 300° F., provides advantages in backseamability, i.e., of prevention of necking down on the forming shoe, this advantage can in some cases (depending on the remainder of the film composition) be obtained even without the presence of such a core layer, as is apparent from a comparison of Example 12 (Comparative) with Example 13 (Comparative). Second, a comparison of Example 13 (Comparative) with Examples 1 and 5 indicates that even if a nylon core layer is present and the film backseams acceptably, outer layers comprising propylene/ethylene copolymers are associated with seal puckering, which is aesthetically and commercially less than preferred, as well as a less than preferred level of seal cook-in survival. Third, a comparison of Example 14 with Examples 1 and 5 indicates that the casings according to Examples 1 and 5 shirred without detectable pinhole formation, in contrast to the comparative casing of Example 14. Also, a comparison of Examples 6, 13, and 14 with Examples 1 and 5, indicates that a more preferred nylon composition can significantly enhance the orientability of the tape during the formation of the film tubing.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. A process for making a backseamed casing, comprising:
   (A) preparing a multilayer heat-shrinkable film comprising:
      (i) a first outer layer serving as an inside casing layer, the first outer layer comprising a first polyolefin comprising at least one member selected from the group consisting of:

(a) ethylene/unsaturated acid copolymer, propylene/ unsaturated acid copolymer, and butene/unsaturated acid copolymer, wherein the unsaturated acid is present in an amount of at least 4 weight percent, based on the weight of the copolymer; and
(b) anhydride-containing polyolefin comprising an anhydride-functionality, wherein the anhydride functionality is present in an amount of at least 1 weight percent, based on the weight of the anhydride-containing polyolefin;
(ii) a second layer comprising at least one member selected from the group consisting of polyester and a first polyamide; and
(iii) a third layer serving as an outside casing layer, the third layer comprising at least one member selected from the group consisting of second polyolefin, polystyrene, and a second polyamide; and
wherein the second layer is between the first layer and the third layer, with the film having has a thickness of at least 5% of a total thickness of the heat-shrinkable casing film;
(B) wrapping the film longitudinally around a forming shoe with opposing length film sheet edges being overlapped or abutted with one another;
(C) sealing the film longitudinally to form a backseam; followed by
(D) forwarding the film.

2. The process according to claim 1, wherein the third layer comprises the second polyolefin.

3. The process according to claim 2, wherein the second layer comprises the first polyamide.

4. The process according to claim 2, wherein the first layer further comprises a third polyolefin comprising at least one member selected from the group consisting of polyethylene homopolymer, polyethylene copolymer, polypropylene homopolymer, polypropylene copolymer, polybutene homopolymer, and polybutene copolymer.

5. The process according to claim 4, wherein the second polyolefin has a vicat softening point of at least 90° C., and the third polyolefin has a vicat softening point of at least 90° C.

6. The process according to claim 5, wherein the first polyolefin comprises an ethylene/unsaturated acid copolymer having an unsaturated acid mer present in an amount of at least 9 percent, based on the weight of the ethylene/unsaturated acid copolymer.

7. The process according to claim 5, wherein the third layer comprises the second polyamide.

8. The process according to claim 2, wherein the first polyolefin comprises an ethylene/unsaturated acid copolymer, the unsaturated acid is present in an amount of at least 6 weight percent, based on the weight of the ethylene/unsaturated acid copolymer.

9. The process according to claim 8, wherein the casing film further comprises a fourth layer, the fourth layer being an inner layer serving as an O$_2$-barrier layer, the fourth layer comprising at least one member selected from the group consisting of ethylene/vinyl alcohol copolymer, polyvinylidene chloride copolymer, polyethylene carbonate copolymer and polyamide.

10. The process according to claim 9, wherein the second layer and the fourth layer are directly adhered.

11. The process according to claim 9, wherein the casing film further comprises a fifth layer and a sixth layer, wherein:
the fifth layer is between the first layer and the second layer, and the sixth layer is between the second layer and the third layer;
the fifth layer comprises at least one member selected from the group consisting of fourth polyolefin, polystyrene and polyurethane; and
the sixth layer comprises at least one member selected from the group consisting of fifth polyolefin, polystyrene and polyurethane.

12. The process according to claim 1, wherein the second layer consists essentially of at least one member selected from the group consisting of polyester, and first polyamide.

13. The process according to claim 12, wherein:
the second layer has a thickness of from about 5 to 20 percent, based on a total thickness of the multilayer film; and
the fourth layer has a thickness of less than about 15%, based on a total thickness of the multilayer film.

14. The process according to claim 12, wherein the first polyamide comprises at least one member selected from the group consisting of polyamide 6, polyamide 66, polyamide 9, polyamide 10, polyamide 11, polyamide 12, polyamide 69, polyamide 610, polyamide 612, polyamide 6I, polyamide 6T, and copolymers thereof.

15. The process according to claim 1, wherein the casing film has biaxial orientation, and a free shrink, at 185° F., of at least 10% in at least one direction.

16. The process according to claim 15, wherein at least a portion of the casing film comprises a crosslinked polymer network.

17. The process according to claim 1, wherein the backseam casing is a lap-seal backseam casing.

18. The process according to claim 1, wherein the second layer comprises the first polyamide and further comprises a third polyamide.

19. The process according to claim 1, wherein the second layer has a thickness of from 5% to about 20% of a total thickness of the heat-shrinkable casing film total film thickness.

20. A process for making a backseamed casing, comprising:
(A) preparing a multilayer heat-shrinkable film comprising:
(i) a first outer layer serving as an inside casing layer, the first outer layer comprising a first polyolefin, the first outer layer having a surface energy level of less than about 34 dynes/cm;
(ii) a second layer comprising at least one member selected from the group consisting of polyester and a first polyamide; and
(iii) a third layer serving as an outside casing layer, the third outer layer comprising at least one member selected from the group consisting of a second polyolefin, polystyrene and a second polyamide;
wherein the second layer is between the first layer and the third layer, and the second layer has a thickness of at least 5% of a total thickness of the heat-shrinkable casing film, and the first outer layer does not comprise a blend of a propylene/ethylene copolymer and homogeneous ethylene/alpha-olefin copolymer having a density of less than 0.90 g/cc wherein the blend makes up a majority of the first outer layer;
(B) wrapping the film longitudinally around a forming shoe with opposing length film sheet edges being overlapped or abutted with one another;
(C) sealing the film longitudinally to form a backseam; followed by
(D) forwarding the film.

21. The process according to claim 20, wherein the second layer comprises the first polyamide.

22. The process according to claim 21, wherein the first polyamide comprises at least one member selected from the group consisting of polyamide 6, polyamide 66, polyamide 9, polyamide 10, polyamide 11, polyamide 12, polyamide 69, polyamide 610, polyamide 612, polyamide 6I, polyamide 6T, and copolymers thereof.

23. The process according to claim 22, wherein the first polyamide comprises at least one member selected from the group consisting of polyamide 6, polyamide 6I, polyamide 6T, and copolymers thereof.

24. The process according to claim 20, wherein the second polyolefin has a vicat softening point of at least 90° C., and the third polyolefin has a vicat softening point of at least 90° C.

25. The process according to claim 20, wherein the casing film has biaxial orientation, and a free shrink, at 185° F., of at least 10% in at least one direction.

26. The process according to claim 20, wherein at least a portion of the casing film comprises a crosslinked polymer network.

27. The process according to claim 20, wherein the backseamed casing is a lap-seal backseamed casing.

28. The process according to claim 20, wherein the second layer comprises the first polyamide and further comprises a third polyamide.

* * * * *